US007012771B1

(12) United States Patent
Asgari et al.

(10) Patent No.: US 7,012,771 B1
(45) Date of Patent: Mar. 14, 2006

(54) PER ZONE VARIABLE BPI FOR IMPROVING STORAGE DEVICE CAPACITY AND YIELD

(75) Inventors: Saeed Asgari, Grafton, MA (US); Mathew Vea, Shrewsbury, MA (US); George Iszlai, Sterling, MA (US)

(73) Assignee: Maxtor Corporation, Longmont, CO (US)

( * ) Notice: Subject to any disclaimer, the term of this patent is extended or adjusted under 35 U.S.C. 154(b) by 231 days.

(21) Appl. No.: 10/058,586

(22) Filed: Jan. 26, 2002

(51) Int. Cl.
*G11B 27/36* (2006.01)

(52) U.S. Cl. .......................................... 360/31; 360/48

(58) Field of Classification Search .................. 360/31, 360/48; 714/704
See application file for complete search history.

(56) References Cited

U.S. PATENT DOCUMENTS

| | | | | |
|---|---|---|---|---|
| 4,799,112 A | | 1/1989 | Bremmer et al. | 360/31 |
| 5,216,655 A | | 6/1993 | Hearn et al. | 396/58 |
| 5,521,945 A | | 5/1996 | Knudson | 375/341 |
| 5,537,264 A | | 7/1996 | Pinteric | 360/31 |
| 5,587,850 A | | 12/1996 | Ton-that | 360/77.08 |
| 5,596,458 A | | 1/1997 | Emo et al. | 360/48 |
| 6,091,559 A | | 7/2000 | Emo et al. | 360/48 |
| 6,137,644 A | * | 10/2000 | Hetzler et al. | 360/48 |
| 6,182,250 B1 | * | 1/2001 | Ng et al. | 714/704 |

OTHER PUBLICATIONS

U.S. Appl. No. 10/053,220, filed Jan. 17, 2002, Chiao et al.
Jensen, Roy A. et al.; "Demonstration of 500 Megabits per Square Inch with Digital Magnetic Recording;" IEEE Transactions on Magnetics; vol. 26; No. 5; Sep. 1990; pp. 2169-2171.

* cited by examiner

*Primary Examiner*—David Hudspeth
*Assistant Examiner*—Dan I Davidson
(74) *Attorney, Agent, or Firm*—Tejpal S. Hansra

(57) ABSTRACT

A method of defining such a storage format in multiple data storage devices, each data storage device having a plurality of storage media and a plurality of corresponding data transducer heads, each transducer head for recording on and playback of information from a corresponding storage medium in at least one zone, wherein each zone includes a plurality of concentric tracks for recording on and playback of information. The method includes the steps of: selecting a plurality of said data storage devices; for each selected data storage device, measuring a record/playback performance capability of each head at one or more read/write frequencies per zone; based on said performance capability measurements, generating storage density distributions corresponding to at least a number of the heads in said selected data storage devices; selecting a group of read/write frequencies for said multiple data storage devices, two or more frequencies for each zone, based on said storage density distributions; and assigning one of said read/write frequencies to each head based on performance capability of that head.

62 Claims, 15 Drawing Sheets

PER ZONE VARIABLE BPI FOR IMPROVING STORAGE DEVICE CAPACITY AND YIELD

FIELD OF THE INVENTION

The present invention relates to information storage on a storage media such as a disk in a disk drive.

BACKGROUND OF THE INVENTION

Data storage devices such as disk drives are used in many data processing systems. Typically a disk drive includes a magnetic data disk having disk surfaces with concentric data tracks, and a transducer head paired with each disk surface for reading data from and writing data to the data tracks.

Disk drive storage capacity increases by increasing the data density (or areal density) of the data stored on the disk surfaces. Data density is the linear bit density on the tracks multiplied by the track density across the disk surface. Data density is measured in bits per square inch (BPSI), linear bit density is measured in bits per inch (BPI) and track density is measured in tracks per inch (TPI). As data density increases, the head performance distribution also increases which diminishes disk drive storage capacity and yield.

Conventional disk drives fail to account for the different capabilities of the head and disk surface pairs. Conventionally, each disk surface is formatted to store the same amount of data as every other disk surface. However, each head and disk surface pair has unique data recording capability, such as sensitivity and accuracy, which depends on the fly height of the head over the disk surface, the magnetic properties of the head and the quality/distribution of the magnetic media for the disk surface. Thus, in conventional disk drives a head and disk surface pair that has a low error rate is formatted to the same BPI and TPI as a head and disk surface pair that has a high error rate.

Conventional disk drive manufacturing applies a single error rate and a single data storage level for the head and disk surface pairs, and scraps disk drives that include a low performing head and disk surface pair that fails to meet the qualifying requirements. This lowers storage capacity due to inefficient use of high performing head and disk surface pairs that can store more data, and lowers yield due to disk drives being scrapped if they include a low performing head and disk surface pair even if they also include a high performing head and disk surface pair.

U.S. Pat. Nos. 6,091,559 and 5,596,458 provide different BPI on different disk surfaces, however these approaches do not take into consideration multiple constraints, including head performance across the stroke per disk surface, performance requirements such as throughput and manufacturing requirements such as test time. Instead, disk surface zone frequencies are selected based on a single metric for one head.

There is, therefore, a need for storing data in a disk drive which improves disk drive storage capacity and yield and accounts for head performance variation.

SUMMARY OF THE INVENTION

The present invention satisfies this need.

In an embodiment, a variable BPI storage format is a function of zones in data storage devices, such as disk drives, based on head performance variation between different heads in a set of data storage devices.

In another embodiment, a population of disk drives is selected, and head performance measurements are taken for disk surface locations at different frequencies. Head performance distributions obtained from the head performance measurements provide storage formats for the disks by determining different read/write frequencies for the zones, and the heads in each disk drive are assigned to the frequencies.

The head allocations and assignments are per head per zone, taking into consideration head performance variation across the zones. For instance, if a first head performs well at the inner diameter (ID) of the disk but poorly at the outer diameter (OD) of the disk, and a second head has reverse performance, then the first head is assigned a high BPI at the ID and a low BPI at the OD, and the second head is assigned in the opposite fashion. The per zone variable BPI storage format improves storage capacity by taking several manufacturing and customer constraints into consideration. Performance of each head across the stroke of the disk surface, as well as performance variation from one head to another, determines the storage format and the head assignments.

In another embodiment, the head performance and the storage format are determined off-line at development/design time, and then the heads are assigned to the different frequencies at manufacturing time. For example, the storage format for each zone and the number of heads allocated to each data density are preselected at design time, and then the heads are assigned to high/low data density storage formats at manufacturing time.

In another embodiment, a method defines the storage format in data storage devices, with each data storage device having multiple storage media and corresponding heads, each head for recording on and playback of information from a corresponding storage media in multiple zones, and each zone including concentric tracks for recording on and playback of information. The method includes (1) selecting a sample of the data storage devices, (2) for each selected data storage device, measuring a record/playback performance of each head at one or more read/write frequencies per zone, (3) generating head performance distributions based on the head performance measurements, (4) selecting a group of read/write frequencies for the data storage devices, two or more frequencies for each zone, based on the head performance distributions, and thereafter, during manufacturing, (5) assigning one of the read/write frequencies to each head based on the performance of that head.

Advantageously, the present invention provides consistent performance (both sequential and random throughput) across a population of disk drives, improves storage capacity and yield and reduces test time.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Data storage devices used to store data for computer systems include, for example, disk drives, floppy drives, tape drives, optical and magneto-optical drives and compact drives. Although the present invention is illustrated by way of a disk drive, the present invention can be used in other data storage devices and other storage media, including non-magnetic storage media, is as apparent to those of ordinary skill in the art and without deviating from the scope of the present invention.

Figure 1A:
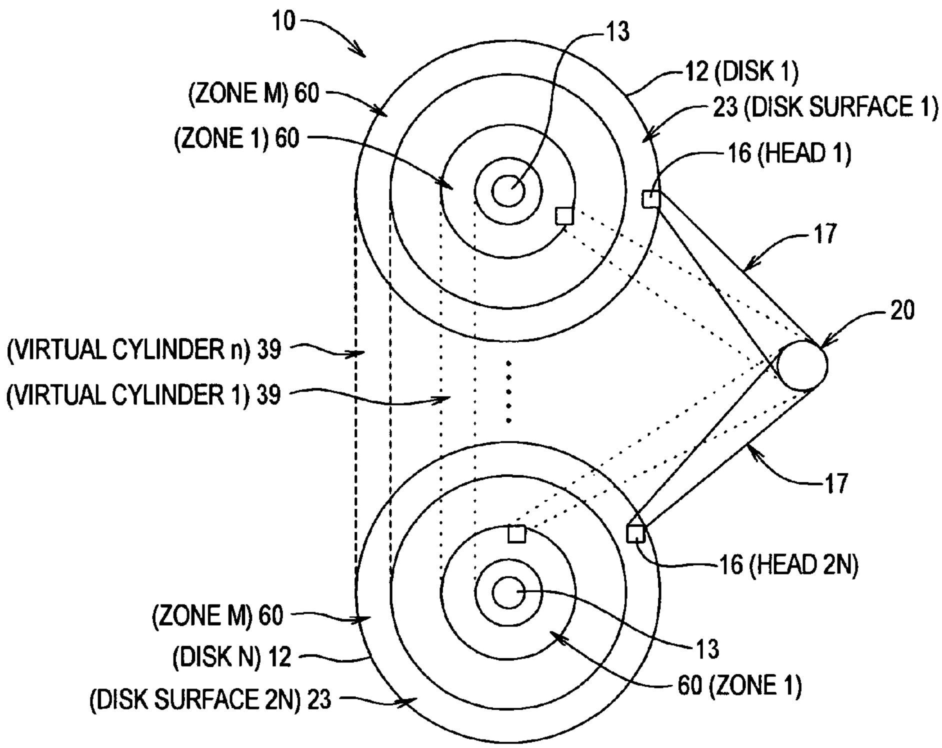
FIG. 1A shows a disk drive with a data storage format.
Figure 1B:
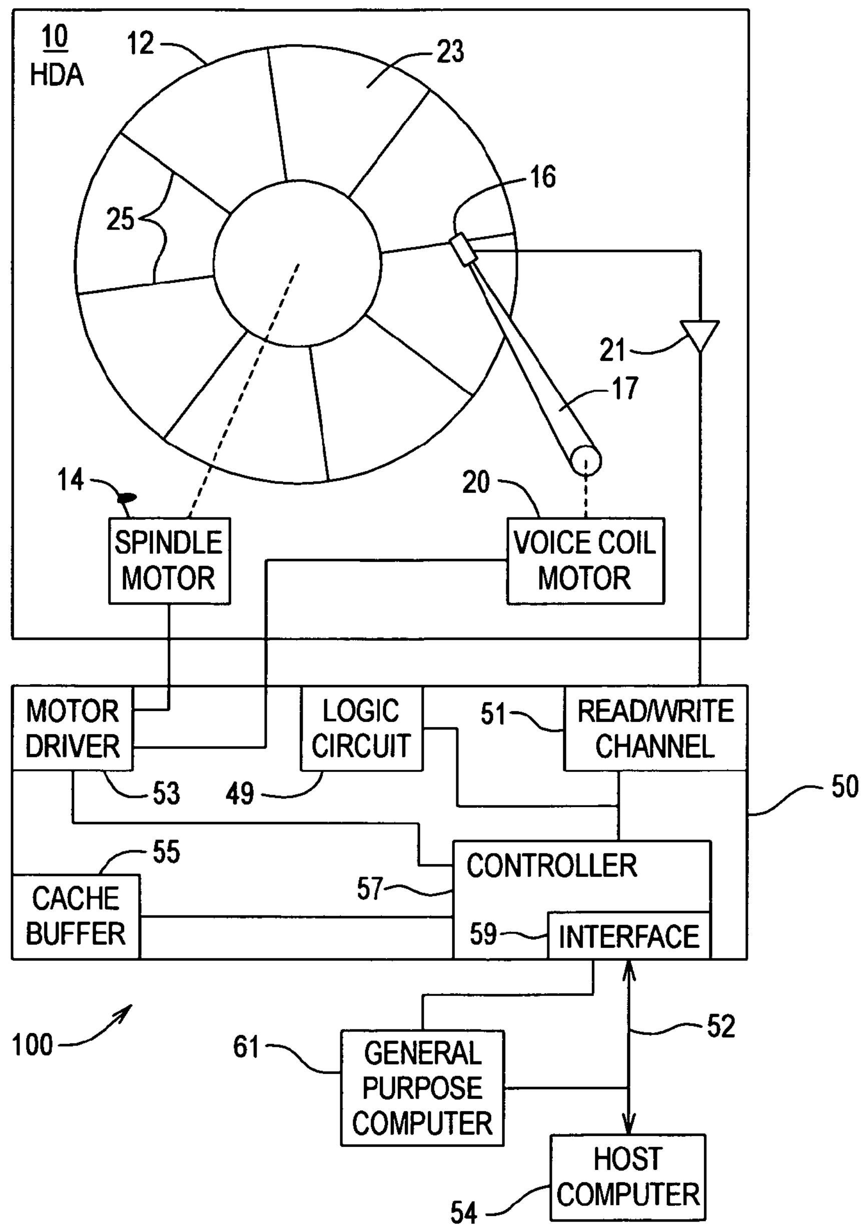
FIG. 1B shows drive electronics for the disk drive.
Figure 1C:
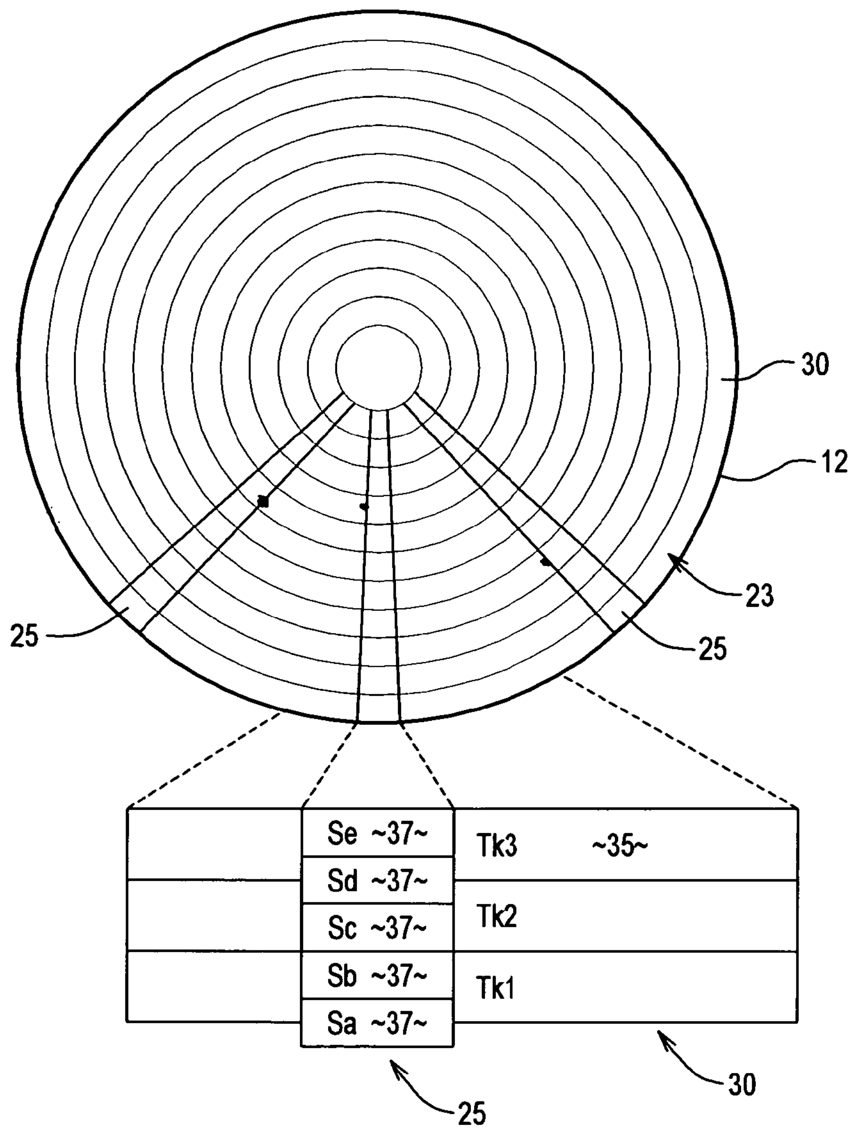
FIG. 1C shows servo tracks and data tracks on a disk surface.

FIGS. 1A–1C show a hard disk drive 100 diagrammatically depicted for storing user data and/or operating instructions for a host computer 54. The disk drive 100 includes an electromechanical head-disk assembly 10 that includes one or more rotating data storage disks 12 mounted in a stacked, spaced-apart relationship upon a spindle 13 rotated by a spindle motor 14 at a predetermined angular velocity.

Each disk 12 includes at least one disk surface 23, and usually two disk surfaces 23 on opposing sides. Each disk surface 23 has associated magnetic media for recording data. The spindle motor 14 rotates the spindle 13 to move the disks 12 past the magnetic transducer heads 16 suspended by the suspension arms 17 over each disk surface 23. Generally, each head 16 is attached to a suspension arm 17 by a head gimbal assembly (not shown) that enables the head 16 to swivel to conform to a disk surface 23. The suspension arms 17 extend radially from a rotary voice coil motor 20. The voice coil motor 20 rotates the suspension arms 17 and thereby positions the heads 16 over the appropriate areas of the disk surfaces 23 in order to read from or write to the disk surfaces 23. Because the disks 12 rotate at relatively high speed, the heads 16 ride over the disk surfaces 23 on a cushion of air (air bearing).

Each head 16 includes a read element (not shown) for reading data from a disk surface 23 and a write element (not shown) for writing data to a disk surface 23. Most preferably, the read element is a magneto-resistive or giant magneto-resistive sensor and the write element is inductive and has a write width which is wider than a read width of the read element.

Each disk surface 23 is divided into concentric circular data tracks 30 that each have individually addressable data sectors 35 in which user data is stored in the form of magnetic bits. The data sectors 35 are separated by narrow embedded servo sectors 25 arranged in radially extending servo spokes. The servo sectors 25 include a series of phase-coherent digital fields followed by a series of constant frequency servo bursts. The servo bursts are radially offset and circumferentially sequential, and are provided in sufficient numbers that fractional amplitude read signals generated by the head 16 from portions of at least two servo bursts passing under the head 16 enable the controller 57 to determine and maintain proper position of the head 16 relative to a data track 30. A servo burst pattern for use with a head that includes a magneto-resistive read element and an inductive write element is described by commonly assigned U.S. Pat. No. 5,587,850 entitled "Data Track Pattern Including Embedded Servo Sectors for Magneto-Resistive Read/Inductive Write Head Structure for a Disk Drive" which is incorporated herein by reference.

The controller 57 controls the heads 16 to read from and write to the disk surfaces 23. The controller 57 preferably is an application specific integrated circuit chip (ASIC) which is connected by a printed circuit board 50 to other ASICs, such as a read/write channel 51, a motor driver 53 and a cache buffer 55. The controller 57 preferably includes an interface 59 which connects to the host computer 54 via a known bus 52 such as an ATA or SCSI bus.

The controller 57 executes embedded or system software including programming code that monitors and operates the disk drive 100. During a read or write operation, the host computer 54 determines the address where the data is located in the disk drive 100. The address specifies the head 16, the data track 30 and the data sector 35. This data is transferred to the controller 57 which maps the address to the physical location in the disk drive 100, and in response to reading the servo information in the servo sectors 25, operates the voice coil motor 20 to position the head 16 over the corresponding data track 30. As the disk surface 23 rotates, the head 16 reads the servo information embedded in each servo sector 25 and also reads an address of each data sector 35 in the data track 30.

During a read operation, when the identified data sector 35 appears under the head 16, the entire contents of the data sector 35 containing the desired data is read. In reading data from the disk surface 23, the head 16 senses a variation in an electrical current flowing through the read element when it passes over an area of flux reversals on the disk surface 23. The flux reversals are transformed into recovered data by the read/write channel 51 in accordance with a channel algorithm such as partial response, maximum likelihood (PRML). The recovered data is then read into the cache buffer 55 where it is transferred to the host computer 54. The read/write channel 51 most preferably includes a quality monitor which measures the quality of recovered data and provides an indication of the data error rate. One channel implementation which employs channel error metrics is described in commonly assigned U.S. Pat. No. 5,521,945 entitled "Reduced Complexity EPR4 Post-Processor for Sampled Data Detection" which is incorporated herein by reference. The present invention uses the indication of recovered data error to select linear bit density, track density and/or error correction codes.

During a write operation, the host computer 54 remembers the address for each file on the disk surface 23 and which data sectors 35 are available for new data. The controller 57 operates the voice coil motor 20 in response to the servo information read back from the servo sectors 25 to position the head 16, settles the head 16 into a writing position, and waits for the appropriate data sector 35 to rotate under the head 16 to write the data. To write data on the disk surface 23, an electrical current is passed through a write coil in the inductive write element of the head 16 to create a magnetic field across a magnetic gap in a pair of write poles that magnetizes the disk surface 23 under the head 16. When the data track 30 is full, the controller 57 moves the head 16 to the next available data track 30 with sufficient contiguous space for writing data. If still more track capacity is required, another head 16 is used to write data to a data sector 35 of another data track 30 on another disk surface 23.

The present invention increases the storage capacity and yield of data storage devices, such as the disk drive 100, having magnetic media surfaces, such as the disk surfaces 23.

Vertical Zoning

In every disk drive, there is a distribution associated with the head and disk surface pair performance. The present invention takes advantage of that distribution to determine different linear bit density (BPI) recording frequency assignments for the heads, and optionally track allocation.

A set of disk drives is selected, and head performance measurements are taken for each selected disk surface location in the disk drives at different frequencies. Empirical frequency capability histograms are extracted at a target performance metric from the measurement data. Head performance distributions (such as joint BPI distributions) are estimated from the histograms and fed into a format optimizer to obtain and design vertically zoned frequency format profiles across the stroke and the disk surface as well as the optimal number of head allocations to the frequencies. Once the frequency format profiles and the optimal number of head allocations are determined, during a test process, every head at every zone is assigned to one of the frequencies based on the head's performance.

FIG. 1A shows a storage format for the disk drive 100. Each disk surface 23 includes zones 60 that extend from one radius of the disk 12 to another radius of the disk 12, and the format of the zones 60 on each disk surface 23 is the same. The variable BPI storage format is a function of the zones 60 on each disk surface 23 based two data recording formats—high data density and low data density—that use (1) head performance variation from one head 16 to the next head 16 in the disk drive 100, and (2) the performance variation of a given head 16 across the stroke of a disk surface 23.

The disk drive 100 includes the disks 12 depicted as disks 1 to N, the heads 16 depicted as heads 1 to 2N, and the disk surfaces 23 depicted as disk surfaces 1 to 2N. Each disk 12 includes two opposing disk surfaces 23, and each head 16 is associated with one of the disk surfaces 23. For instance, head 1 is associated with disk surface 1 of disk 1, head 2 is associated with disk surface 2 of disk 1, head 3 is associated with disk surface 3 of disk 2, and head 2N is associated with disk surface 2N of disk N.

Each disk surface 23 includes the zones 60 depicted as zones 1 to M across its stroke, with zone 1 at the ID and zone M at the OD. The radial boundaries on zone 1 of disk surface 1 of disk 1 are the same as the radial boundaries of zone 1 on disk surface 2 of disk 1, and so on. Similarly, the radial boundaries of zone M on disk surface 1 of disk 1 are the same as the radial boundaries of zone M on disk surface 2 of disk 1, and so on. However, different zones 60 across the stroke on each disk surface 23 need not necessarily have the same number of data tracks 30 or TPI. For example, zone 1 on disk surface 1 of disk 1 has the same number of data tracks 30 and the same radial boundaries as zone 1 on disk surface 1 of disk N, and zone M on disk surface 1 of disk 1 has the same number of data tracks 30 and the same radial boundaries as zone M on disk surface 1 of disk N. However, the number of data tracks 30 in zones 1 and M can be different.

Each disk surface 23 also includes virtual cylinders 39 depicted as virtual cylinders 1 to n. Each zone 60 includes multiple virtual cylinders 39, and each virtual cylinder 39 includes multiple data tracks 30 on each disk surface 23. Further, within a virtual cylinder 39, different heads 16 may read and write at different frequencies (variable BPI) to provide vertical zoning.

FIG. 1C shows the data tracks 30 and the servo tracks 37 on the disk surface 23. The data tracks 30 include the data sectors 35, and the servo tracks 37 include the servo sectors 25. Five servo tracks 37 depicted as servo tracks Sa, Sb, Sc, Sd and Se are shown in relation to three data tracks 30 depicted as data tracks Tk1, Tk2 and Tk3.

The servo tracks 37 are written on the disk surface 23 during manufacturing at a servo track density that is about 150% of the maximum data track density. The servo track density is determined by the maximum read width and the minimum write width of a population of the heads 16. After writing the servo tracks 37 at the servo track pitch, the data tracks 30 can be written at any radial position between the servo tracks 37. The data track density (TPI) can be selected from predetermined levels or can be based on the location of a data sector 35. Additional tests can be performed to determine the optimum data track density of the disk surface 23. Each servo track 37 comprises radially similarly situated servo sectors 25 in the servo spokes. For example, the servo track Se contains servo sectors 25 at essentially the same radial distance from the center of the disk 12, the servo track Sd contains servo sectors 25 at essentially the same radial distance from the center of the disk 12, etc.

FIGS. 1D to 1I show vertical zone formats in which different heads 16 on different disk surfaces 23 may read/write at different linear frequencies (variable BPI) on the data tracks 30 within a virtual cylinder 39.

Figure 1D:
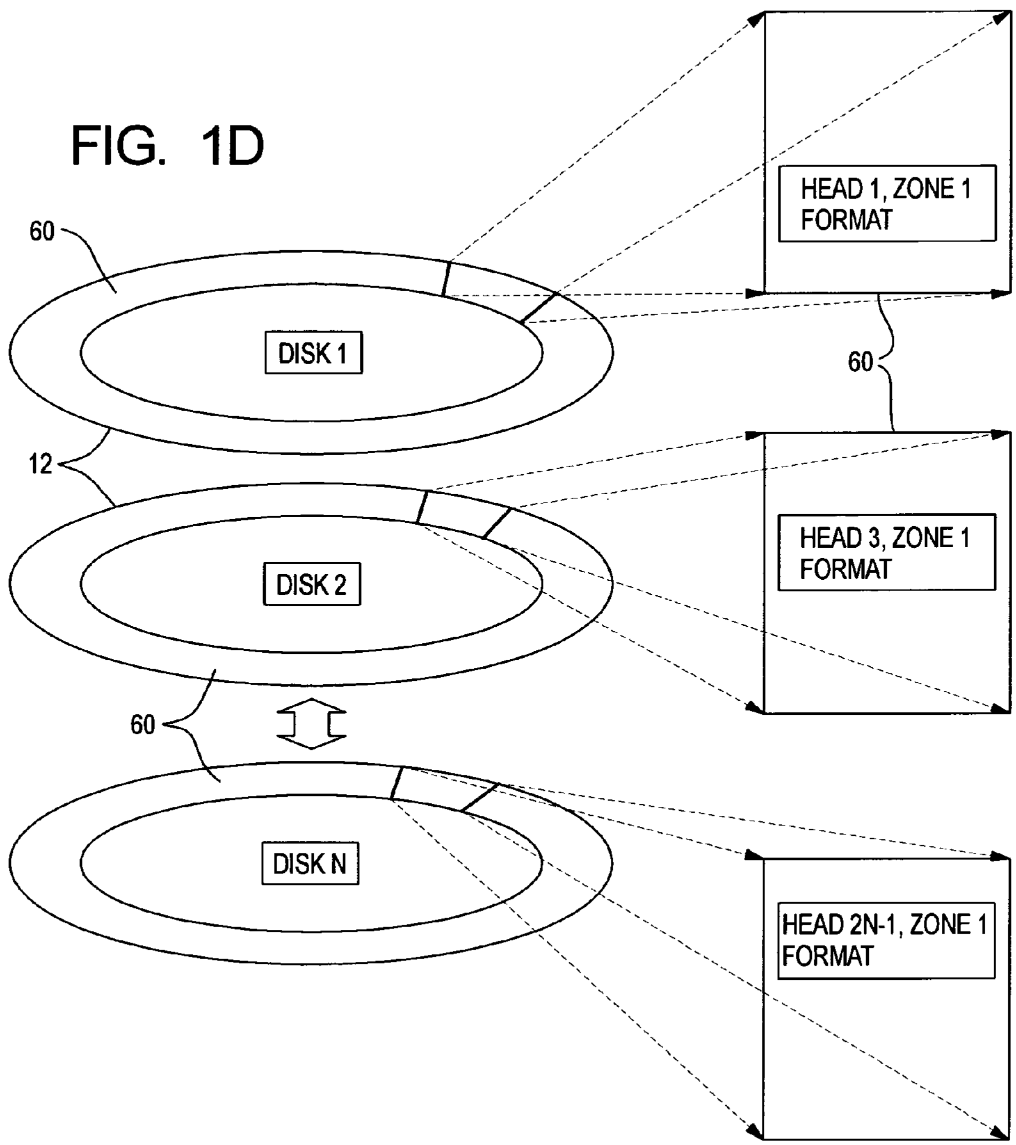
FIG. 1D shows a zone format in the disk drive with N disks, 2N heads and different heads in a zone on different disk surfaces.
Figure 1E:
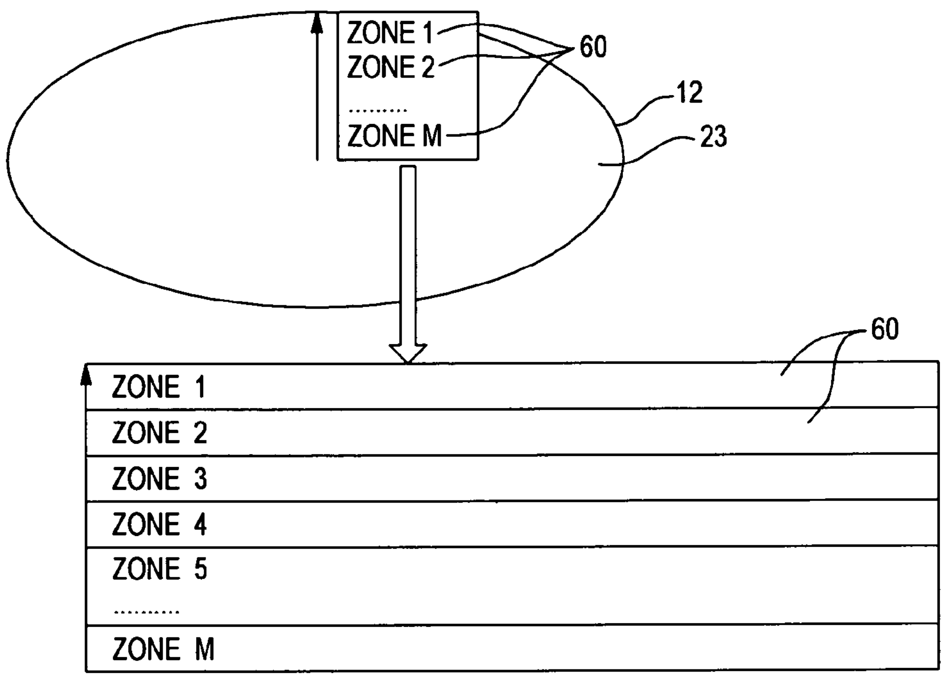
FIG. 1E shows another zone format on a disk surface.
Figure 1F:
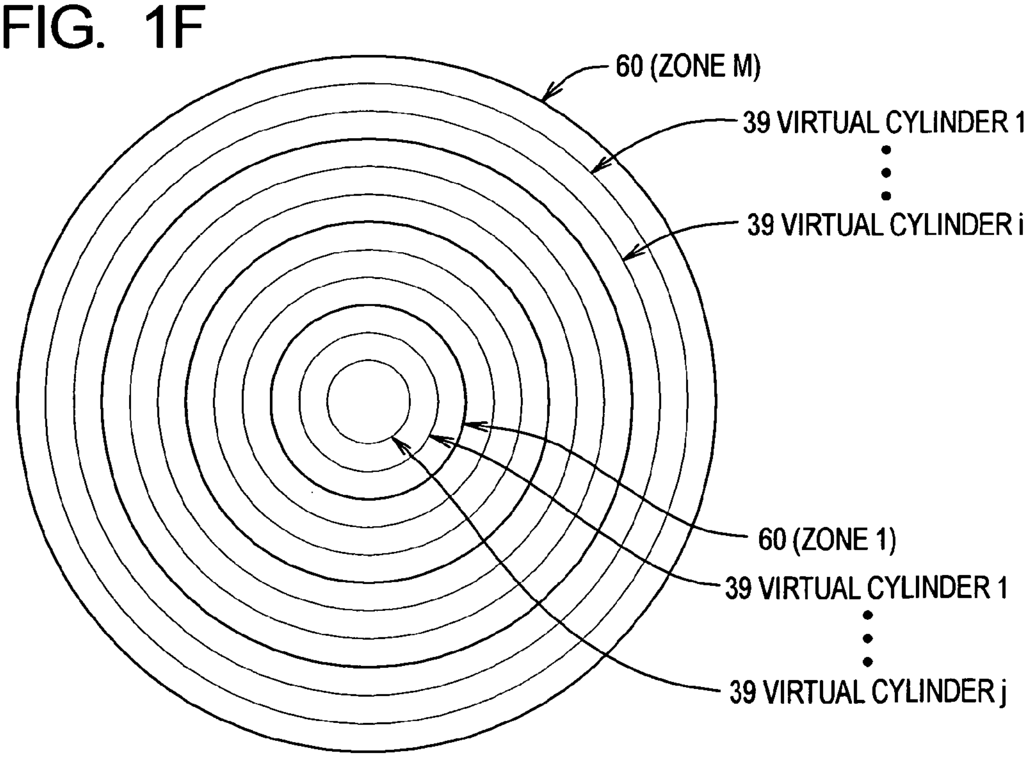
FIG. 1F shows zones on a disk surface that each include virtual cylinders.
Figure 1G:
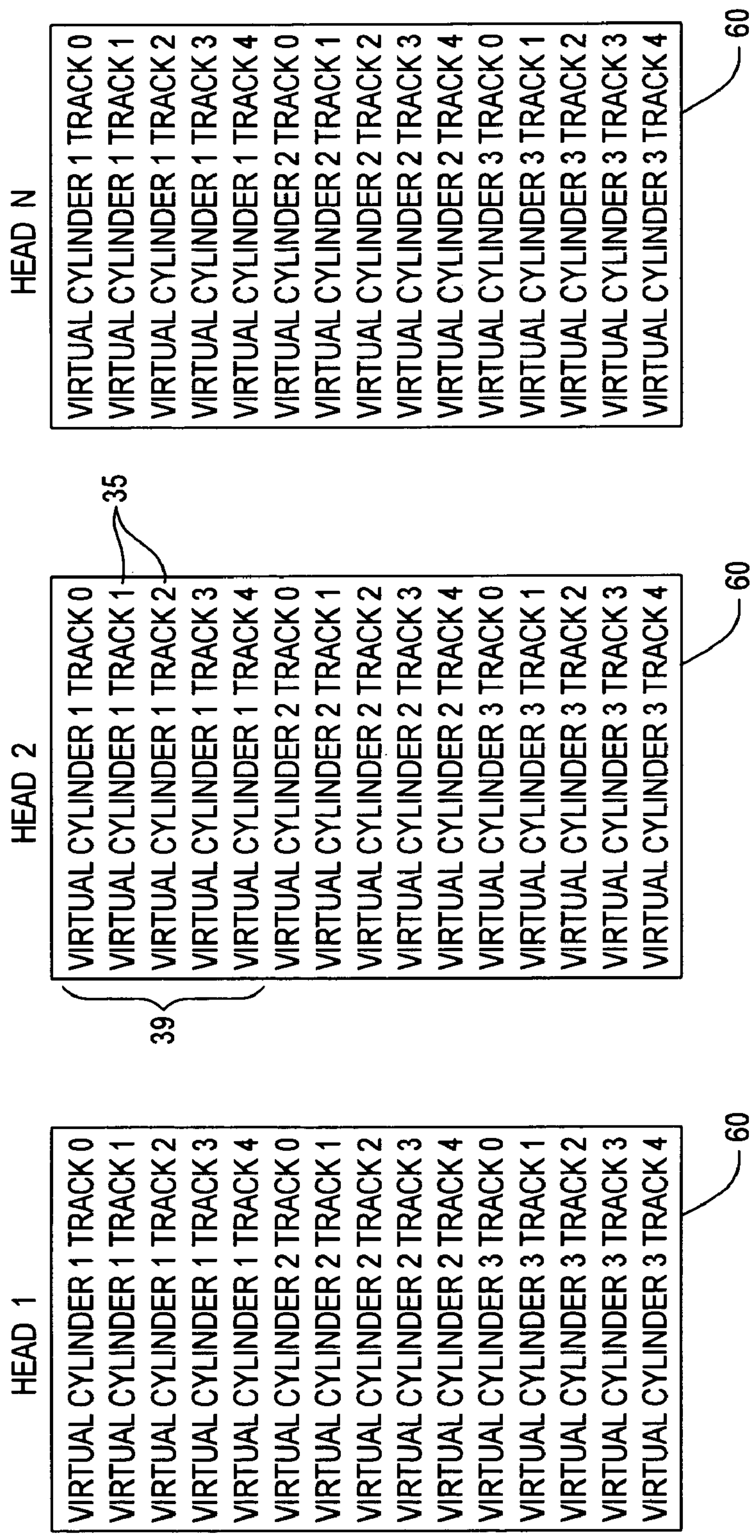
FIG. 1G shows a data track format for the virtual cylinders in a zone on different disk surfaces with corresponding heads.
Figure 1H:
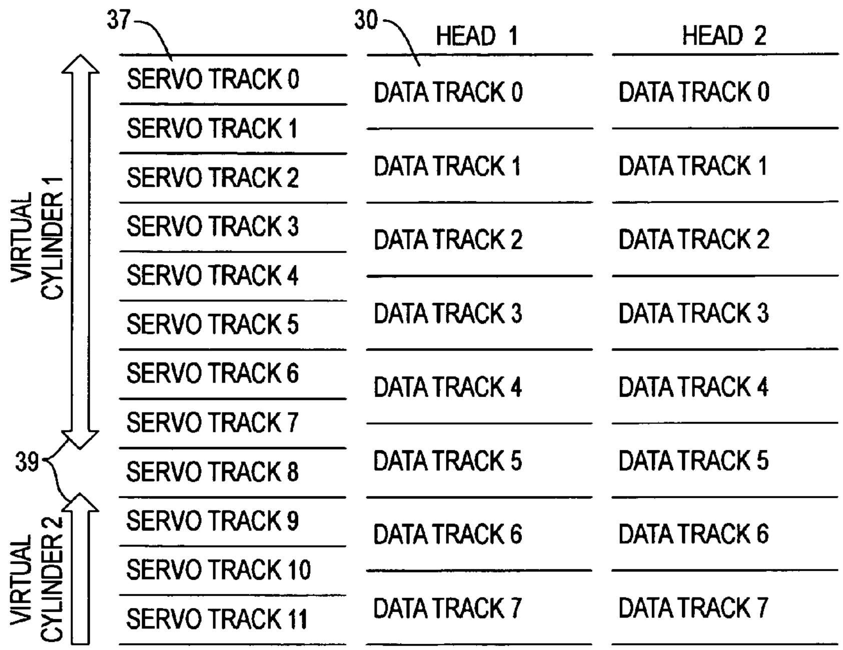
FIG. 1H shows a servo track and data track format for a zone on different disk surfaces with corresponding heads in which the number of servo tracks and data tracks in different virtual cylinders of a zone on different disk surfaces are the same.
Figure 1I:
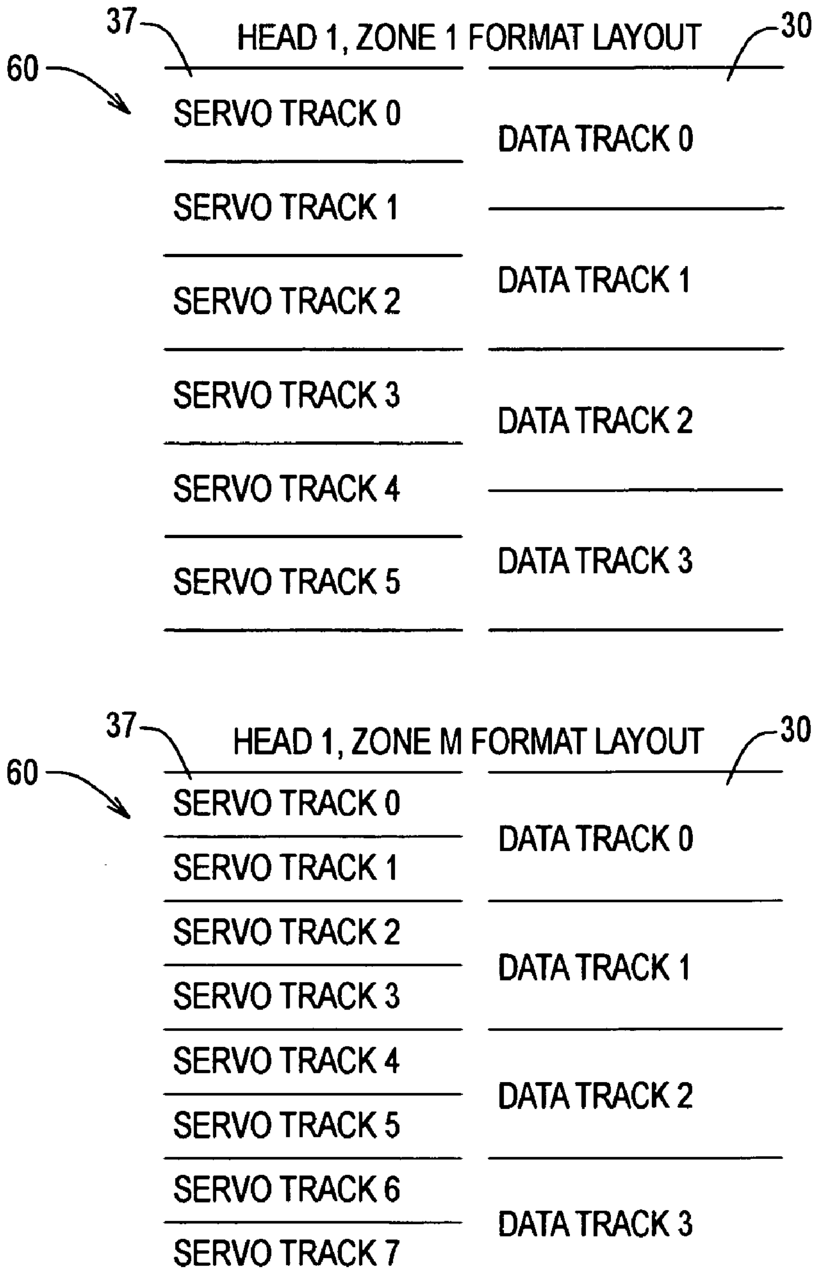
FIG. 1I shows another servo and data track format that varies from zone to zone on a disk surface.

FIG. 1D shows a zone 60 format of the disk drive 100 with N disks 12, 2N heads 16 and different heads 16 in zone 1 on different disks 12. FIG. 1E shows another zone 60 format on the disk surface 23. FIG. 1F shows each zone 60 on the disk surface 23 includes multiple virtual cylinders 39. Zone 1 includes virtual cylinders 1 to j, and zone M includes virtual cylinders 1 to i. The radial boundaries of the zones 60 are shown as dark circles, and the radial boundaries of the virtual cylinders 39 are shown as light circles. FIG. 1G shows a data track 30 format for the virtual cylinders 39 in a zone 60 on different disk surfaces 23 with corresponding heads 16. FIG. 1H shows a data track 30 and servo track 37 format for a zone 60 on different disk surfaces 23 with corresponding heads 16 in which the number of data tracks 30 and servo tracks 37 in different virtual cylinders 39 of a zone 60 on different disk surfaces 23 is the same. FIG. 1I shows a data track 30 and servo track 37 format for zones 60 on the disk surface 23 with a corresponding head 16 in which the data track 30 and servo track 37 format varies from zone 1 to zone M.

Format Optimization

The vertical zoning includes designing, optimizing and selecting two or more recording frequency profiles per zone for a sample number of disk drives off-line during the disk drive development/design phase. Then, for a population of disk drives, in each disk drive, each head is assigned to one of the predetermined frequencies for a given zone during the disk drive manufacturing phase. A predetermined read/write frequency (BPI) is assigned to each head based on a known number of head allocations and the head's performance. A head assigned to a high frequency records more bits on a track, and a head assigned to a low frequency records less bits on a track.

Performance testing of the head and disk surface pairs occurs after full read/write and servo calibration and optimization of the disk drive. If the tested performance of head 1 at zone 1 on disk surface 1 of disk 1 at a given frequency is better than a target performance metric, then head 1 is considered strong since it is capable of storing more information than originally accounted for. Thus, the recording frequency can be increased at zone 1 on disk surface 1 of disk 1 for head 1 yet the performance does not fall below the target performance metric. If the tested performance of head 2 at zone 1 on disk surface 2 of disk 1 at the same frequency is worse than a target performance metric, then head 2 is considered weak but can be compensated for by relaxing the frequency at which head 2 operates to ensure the target performance metric is met. Performing the above trade-off between the heads for all the zones provides frequency profiles across the stroke that are vertically zoned frequency format profiles without loss of storage capacity.

Advantageously, by compensating for head 2, rather than failing the disk drive due to head 2, the vertical zoning improves yield. Furthermore, the format optimizer uses the head performance (read/write frequency capability) distributions at every zone and a target performance metric to design a group of read/write frequency format profiles for strong and weak heads within a given disk drive. The format optimizer also determines the optimal number of strong versus weak heads.

The format optimizer does not determine which specific head is at the high or low frequency, but does provide a breakdown of the number of heads at the high frequency and the number of heads at the low frequency. The breakdown is fixed, performed off-line, and used during the head assignments. Then, in the head assignments during a manufacturing test, out of 2N heads in a disk drive with N disks, the number of heads assigned to each predetermined frequency is determined.

The heads within a set of disk drives are allocated to the predetermined group of read/write frequencies-as part of the optimization process to meet the storage capacity and yield requirements for the disk drives. The allocation process allocates a number of the heads in a disk drive to the predetermined frequencies, however the specific assignment of a particular head to a particular frequency is performed later during the assignment process. For example, in a two read/write frequency design (high frequency and low frequency) for a set of disk drives each with eight heads, in each disk drive for zone 1 on all the disk surfaces, any five of the eight heads are allocated to the high frequency and any three of the eight heads are allocated to the low frequency based on the performance measurements of the heads in the set of the disk drives. Thereafter, the specific assignment of each particular head to a particular predetermined frequency is performed. For example, in a first disk drive heads 2, 5, 6, 7, 8 are assigned to the high frequency and heads 1, 3, 4 are assigned to the low frequency, whereas in a second disk drive heads 1, 4, 5, 6, 7 are assigned to the high frequency and heads 2, 3, 8 are assigned to the low frequency. The specific head assignments depend on the specific capability of the heads in each disk drive.

The optimal number of heads per frequency is determined at the same time that the group of read/write frequencies are selected by the format optimizer by solving a joint constrained optimization problem. For example, in a disk drive with eight heads and a high frequency and a low frequency that are each a different ratio of a reference frequency, in each vertical zone, allocating two heads to the high frequency and six heads to the low frequency provides a specific storage capacity. Changing the frequency ratios and the number of heads allocated to each frequency provides a different storage capacity. Thus, the disk drive storage capacity is a function of the number of heads multiplied by the frequency allocated to each head per zone. For example, if a nominal disk surface data storage is 1 unit, and if the high frequency=4/3× the reference frequency and the low frequency=⅔× the reference frequency, then one head can be at the high frequency for every one head at the low frequency to maintain the average disk surface data storage at 1 unit.

The head performance distributions represent percentages of the heads in the disk drives than can operate at different frequencies. For example, the head performance distribution is a BPI distribution that represents the head frequency capability at a target performance metric. Using the head performance distributions (the head read/write frequency capability distributions at the target performance metric for every zone), the number of heads, the format of the virtual cylinders and the desired storage capacity, the format optimizer determines the frequency for each virtual cylinder in each zone and the number of heads in each disk drive allocated to each frequency to achieve the desired storage capacity. Thereafter, in the assignment process as part of testing each disk drive, each head in a population of disk drives is assigned to one of the predetermined frequencies based on the allocation criteria and the specific head performance. For example, in a disk drive with four heads, the format optimizer considers three heads at the high frequency and one head at the low frequency, then two heads at the high frequency and two heads at the low frequency, and then one head at the high frequency and three heads at the low frequency. Thus, the format optimizer uses the head performance distributions to determine the storage capacity and yield.

In one version of the optimization process, the yield is maximized while meeting a constraint on storage capacity. In another version, the storage capacity is maximized while meeting a constraint on yield. In the former case, the format optimizer uses a format where the maximum number of disk drives qualify and the fewest number of disk drives fail to reach the required storage capacity. For example, in a disk drive with four heads and a nominal disk surface data storage of 1 unit, allocating two heads to the high frequency and two heads to the low frequency provides a nominal data storage of 4 units. In the later case, the format optimizer uses a format where the maximum number of disk drives reach the required storage capacity and the fewest number of disk drives fail to qualify. For example, in a disk drive with four heads and a nominal disk surface data storage of 1 unit, allocating three heads to the high frequency and one head to the low frequency provides a high data storage of 4.66 units.

Thus, the vertical zoning for variable BPI includes an off-line predetermined per zone format design based on disk drive data collection and head performance distribution extraction. In one version, a fixed predetermined zone boundary format is used to design multiple frequency BPI formats based on representative or actual joint BPI distributions at one or more desired target performance metrics (such as off-track symbol error rate) and the joint BPI distributions are extracted from a finite preselected set of disk drives.

The collected data is used to extract the joint BPI distributions for the heads at every preselected zone, and the per zone design of high and low data density formats for the heads is performed off-line. The format optimizer solves a constrained joint optimization off-line to obtain the format designs using well-known constrained optimization routines. Using joint BPI distributions allows consideration of potential correlation of BPI capability of the heads across the stroke as well as the individual contribution of each head to the storage capacity and yield.

The off-line format design allows the format optimizer to consider additional constraints. For example, as more information is obtained in quantifying the thermal stability constraints of the disks (which in turn places an upper bound on linear bit density for the heads) the off-line format design does not exceed these constraints. Likewise, if there are data rate constraints in either the write process or the ASICs, such constraints may be cast within the joint constrained format optimizer to ensure the constraints are not exceeded.

Data Measurement

A measurement procedure is used to collect data from which one-dimensional (1D), two-dimensional (2D) and three-dimensional (3D) BPI distributions at a desired read/write target error rate (or any other metric) can be extracted. Data is collected based on head capability measurements taken at different radial positions on the disk. The distributions represent the capability of each head at different radial positions. For example, several disk drives which collectively include 1000 heads are selected for measurement, and record/playback error rate measurements of the 1000 heads from zone 1 to zone 24 of the disk surfaces at different frequencies are obtained. Thereafter, in post-measurement data processing (a) the BPI capability of each head at a fixed target performance metric at zone 1 is determined to obtain a 1 D BPI distribution, (b) the BPI capability of each head at a fixed target performance metric at zones 1 and 5 is determined to obtain a 2D BPI distribution, and (c) the BPI capability of each head at a fixed target performance metric at zones 1, 5 and 20 is determined to obtain a 3D BPI distribution.

The BPI distributions are then passed to the format optimizer to solve three constrained optimization problems to provide head frequency per zone allocations. The three constrained optimization problems (1) maximize the yield while preserving the storage capacity, (2) maximize the storage capacity while preserving the yield, and (3) maximize the yield while ensuring a target storage capacity is met at a fixed target TPI. Customer related or ASIC data rate constraints are also considered. The format optimizer can solve any of these three problems, and one problem can take priority over another depending on the process phase. For example, at an early development phase where the disk drive components are not mature, meeting the storage capacity may be a challenge. In that phase, the format optimizer can design the variable BPI format profiles by solving the second problem. Then, as the disk drive components mature, meeting the storage capacity becomes easier and meeting the yield becomes more important, the first problem may be solved. Thereafter, as part of a test process, an assignment algorithm ensures the appropriate head assignments to the predetermined high and low data density formats per head and per zone or across the stroke based on the head allocation breakdown of the format optimizer.

The yield is improved while meeting the target storage capacity by allowing a frequency format with high and low frequencies and a predetermined number of high and low performing head allocations. Using realistic constraints such as ASIC data rate limitations, the same fixed target TPI is maintained by increasing the average target BPI across the stroke to achieve the target storage capacity. As such, head performance variation from one head to the next head in the disk drive and for the head across the stroke of the disk surface is used to increase the storage capacity while preserving the yield. For example, the vertical zoning format uses several design constraints to improve yield using a variable high and low BPI design with a fixed predetermined number of head allocations as a function of the zones while meeting the target storage capacity at a fixed target TPI. The head performance variation or correlation across the stroke is also used.

Further, the difference in data storage of two or mores zones on a disk surface is considered as it affects storage capacity. The storage capacity is defined as a weighted combination of the zone capacities across the stroke on each disk surface in the disk drive. A correlation in the head performance statistics is extracted from one head to another head, and for every head considered in a set of disk drives across the stroke on each disk surface.

The joint constrained optimization determines a per zone target high and low data density format. The optimization takes into account constraints including customer related requirements such as minimum logical block count, monotonic data rate, and maximum data rate at the outer zones which can be formulated into additional constraints.

Example Implementation

Figure 2A:
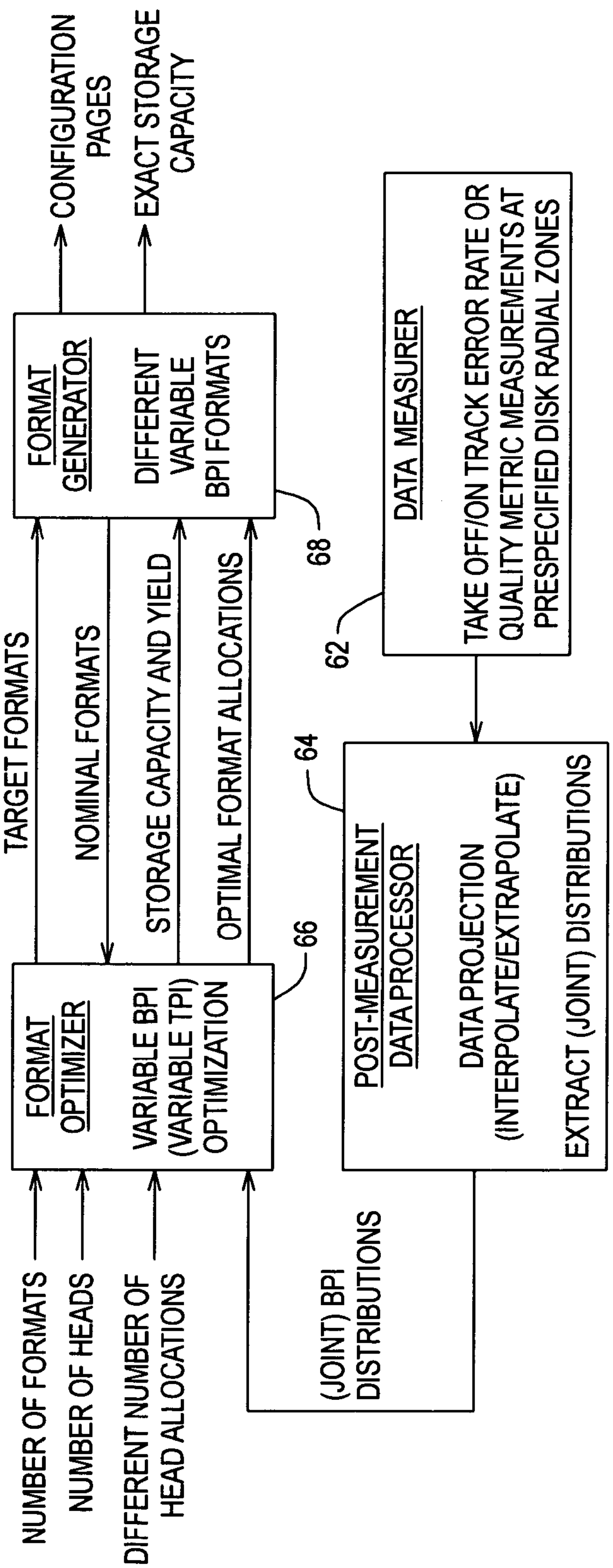
FIG. 2A shows a function and flow diagram for generating the format of FIG. 1A.

FIG. 2A shows a function and flow diagram for generating the optimal data density format shown in FIG. 1A. The function and flow diagram includes a data measurer 62, a post-measurement data processor 64, a format optimizer 66 and a format generator 68.

Data Measurer

The data measurer 62 takes data measurements for every zone at a finite number of frequency samples.

The data measurer 62 implements a measurement procedure that includes the steps of:

(1) Create several different predetermined linear bit density format profiles including a profile of different frequencies per zone across the stroke, such as a first profile including high frequency 1 for zone 1, high frequency 2 for zone 2 . . . high frequency M for zone M, and a second profile including low frequency 1 for zone 1, low frequency 2 for zone 2 . . . low frequency M for zone M to be loaded on a representative number of disk drives selected for the measurement process (or if possible on all the available disk drives for that build);

(2) Load a frequency format profile;

(3) Perform read/write and servo optimization and calibration;

(4) Take head performance measurements including off-track mean square error or quality metric and/or symbol error rate at preselected frequencies for preferably all available zones and save the data; and (5) Repeat steps 2–4 for the remaining frequency format profiles.

The above steps are performed for the selected disk drives in the measurement process.

Thus, in the disk drive 100, the data is recorded on a data sector 35 of the disk surface 23 at the selected data density by positioning the head 16 abutting the data sector 35 and sending the appropriate write signals to the head 16. Typically, a sample of data is recorded on the disk surface 23 such that a significant number of errors are detected (such as ten errors per error rate measurement) to obtain a statistically representative sampling of the error rate for the data sector 35. Thereafter, the recorded data is read by the head 16 and stored by the host computer 54 for evaluation. An error rate of the recorded data is measured or compiled by comparing the written data with the read data, element-by-element. The error rate can be determined using a bit error measurement in which a bit of data read from the disk surface 23 is compared with the correct bit, a bit steam measurement in which a bit stream of data read from the disk surface 23 is compared with a correct bit stream, or a mean square error metric measurement in which a waveform read from the disk surface 23 is compared with an ideal waveform to provide an error signal that is squared and summed to form the error metric.

In this description, a component distribution is defined as a random variation (tolerance) of a prespecified target nominal component parameter such as a head write/read width, and a distribution is defined as a probability distribution function. During the early product development, when the head performance distributions are wide and unreliable, data from a mature set of disk drives is used for extracting reference joint BPI distributions at a target performance metric such as on-track symbol error rate, off-track symbol error rate, on-track mean square error or off-track mean square error. Later, when the head performance variation from one phase to the next in the distribution is expected to be minimal, new sets of measurement data are collected using a selected population of disk drives at their more mature stages.

Thus, a number of BPI formats including the nominal target format are selected. Then, on-track or off-track symbol error rate or mean square error measurements are taken at different preselected locations of the disk surfaces, such as the outer, middle and inner zones. The performance measurements can be limited to these three zones to reduce the measurement time. However, preferably the performance measurements over multiple zones and other measurements such as off-track 747 can be performed. The nominal formats are generated from the data.

Two or more different linear bit density format profiles can be loaded at a time. In one example, two variable BPI format per zone design (high and low data density format profiles) can be created for measurement data collection during every build. In this way, more statistical data can be collected from more disk drives, however there will be only two frequency samples per zone available for post-measurement data processing.

Post-Measurement Data Processor

Post-measurement data processor 64 uses the available performance metric measurements to calculate each head's frequency performance, for instance as kilo flux per inch (kFCI) or kilo bits per inch (kBPI), at a target performance metric. The performance of every head at every zone is determined as a function of the read/write frequency profiles used for the measurements.

For example, if six different frequency profiles are used, then for every head per zone, the data measurer 62 provides measured data as a function of six frequency samples at a target performance metric. In the post-measurement data processor 64, the measured data is sorted and the performance of every head at every zone at the six frequency samples is extracted to generate frequency capability histograms at a target performance metric.

Figure 2B:
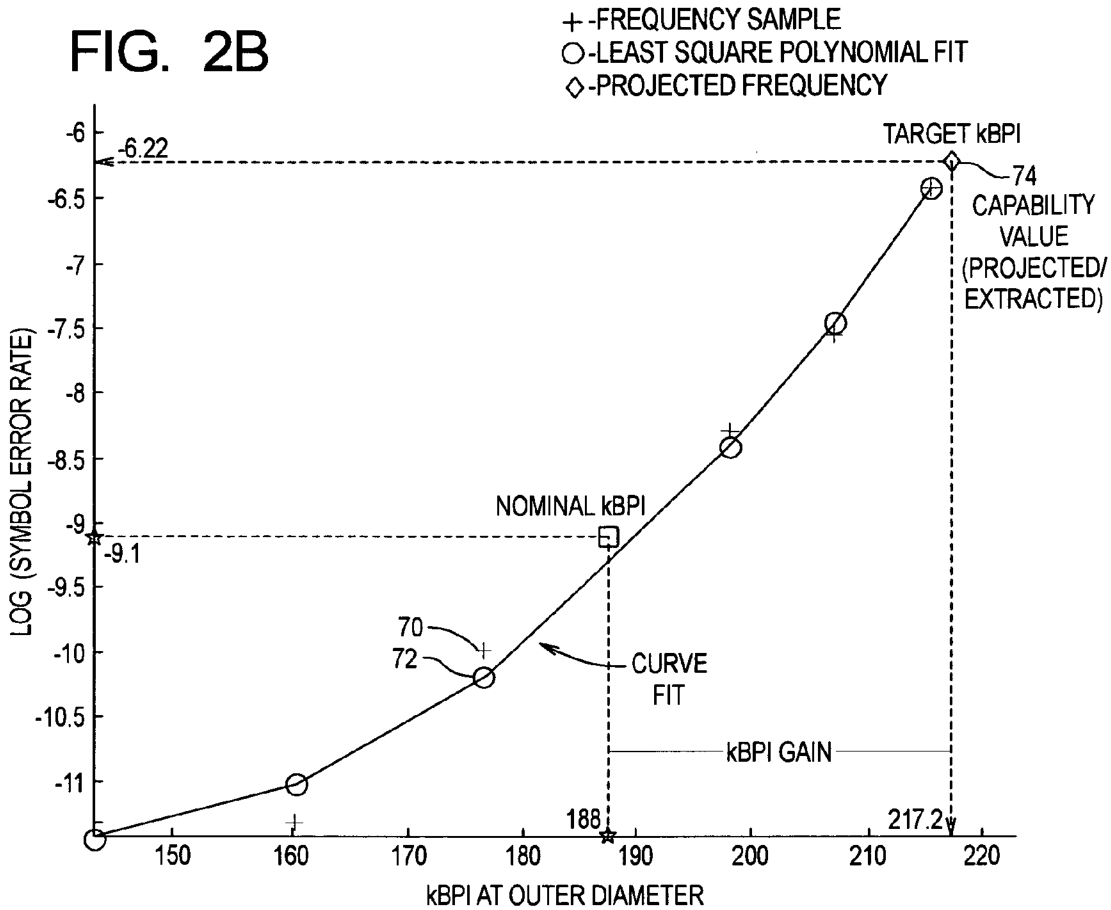
FIG. 2B shows a graph of playback error measurement for a head at a zone at different recording frequencies.

FIG. 2B shows a graph of playback error measurement for a head at a zone at different recording frequencies. The curve shows head performance as a function of frequency (BPI). The x-axis is the read/write frequency in kBPI at the outer diameter, and the y-axis is the on-track symbol error rate on a log scale. Each frequency sample 70 is depicted as "+", each curve fit point 72 is depicted as "o" and each projected frequency 74 is depicted as "◇".

In the illustration, head 1 at zone 1 in disk drive 3 is measured at six frequency samples. The curve is generated using a least square polynomial fit to the six frequency samples. The projected frequency (BPI) for a target on-track symbol error rate is extracted from the curve by interpolation or extrapolation. For example, if the target on-track symbol error rate is $10^{-8}$ then the projected frequency is determined by interpolation, whereas if the target on-track symbol error rate is $10^{-6}$ then the projected frequency is determined by extrapolation. The on-track symbol error rate varies as a function of frequency and increases as the frequency increases.

The nominal kBPI (before vertical zoning) and the kBPI gain relative to the nominal kBPI are also shown. Head 1 can be classified as a strong head because there is reasonably significant margin before its on-track symbol error rate of −9.1 (log) at a nominal frequency/kBPI of ~188 can be changed to a projected on-track symbol error rate of −6.22 at a frequency/kBPI of ~217. Hence, there is a total kBPI gain of ~29, allowing the nominal frequency to increase by 15% while meeting the target on-track symbol error rate performance metric of $6\times10^{-7}$. Thus, head 1 of disk drive 3 has a frequency capability of about 217 at the target on-track symbol error rate of $6\times10^{-7}$, which provides a sample for the generation of a histogram.

Figure 2C:
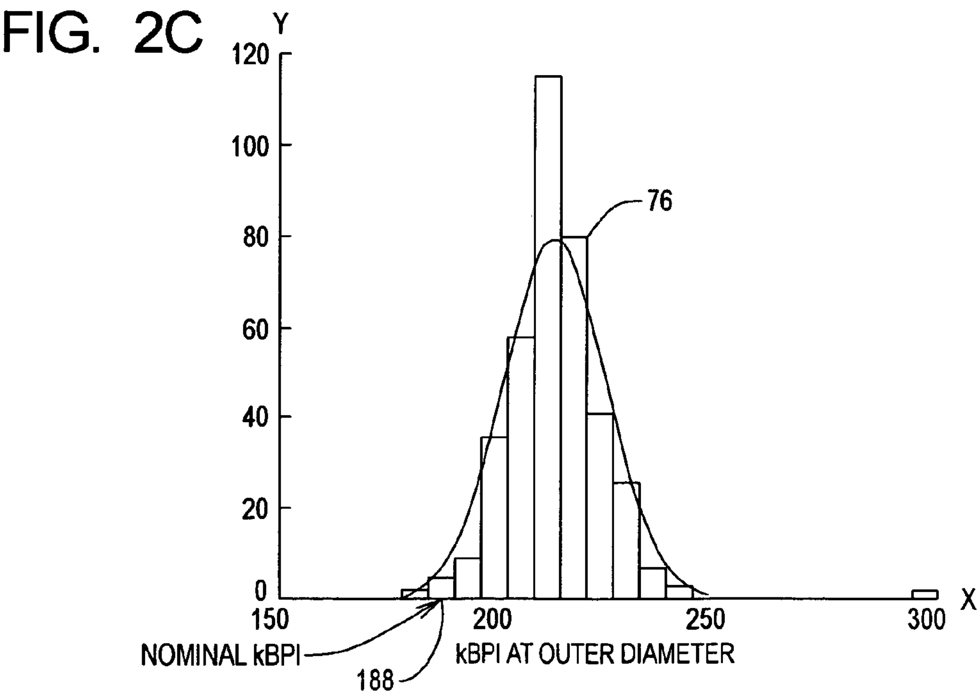
FIG. 2C shows a histogram of the frequency capabilities of the heads in a set of disk drives at a zone at a fixed target error rate.

FIG. 2C shows a histogram of the frequency capabilities of the heads in a set of disk drives at a zone at a target performance metric. The histogram 76 is constructed using the projected frequencies determined in FIG. 2B for the heads in the selected disk drives reading from zone 1 at the target on-track symbol error rate of $6\times10^{-7}$. The x-axis is the projected frequency capability at the outer diameter, and the y-axis is the number of heads. The histogram is extracted and empirical, has a normal distribution fit and has a width that corresponds to the head performance variation.

Additional histograms are constructed for the remaining zones based on the frequency capabilities determined from the graphs based on the performance measurements taken at the remaining zones so that every available head considered in the disk drives under measurement has BPI histograms at a target performance metric per zone.

Thus, performance measurements are provided for each head at each zone in the selected disk drives, the graphs are generated for each head at each zone, the frequency capabilities for each head at each zone are determined for a target performance metric, and the histograms are constructed for each head at each zone for the target performance metric. Likewise, if a histogram of head BPI capability at a target performance metric of a zone (such as an intermediate zone) is not available then the histogram for that zone can be constructed by interpolation or extrapolation. The histograms can be used to estimate a BPI distribution.

Figure 2D:
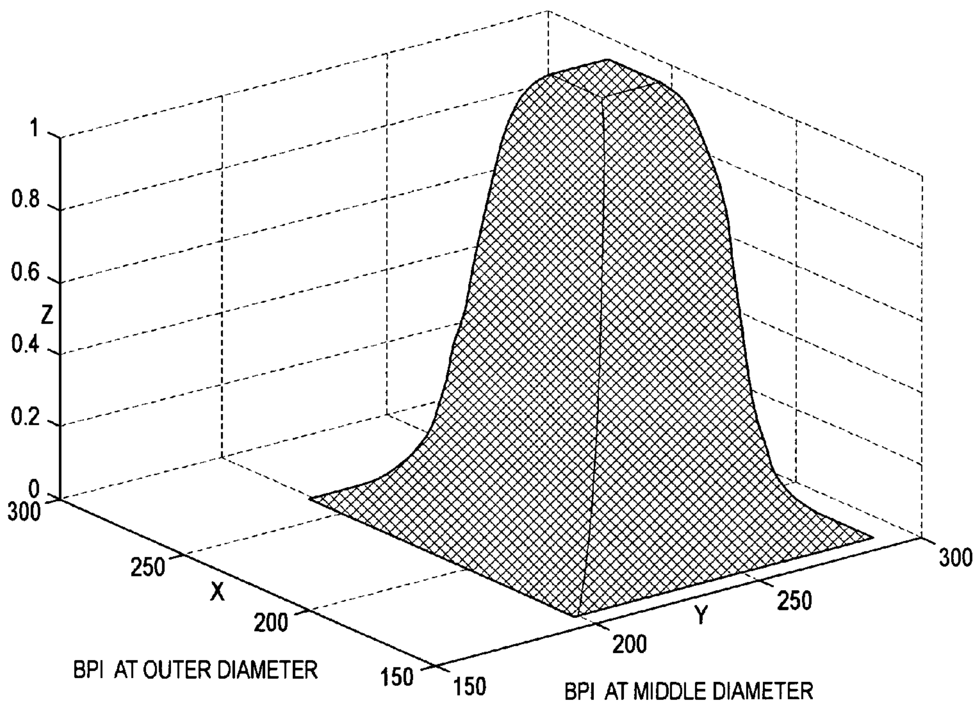
FIG. 2D shows a joint BPI distribution.

FIG. 2D shows a joint BPI distribution calculated from the histograms of the heads in the measured disk drives at a target performance metric. The joint BPI distribution is a 2D distribution based on the histograms in FIG. 2C at the target on-track symbol error rate of $6\times10^{-7}$. The x-axis is the BPI capability of the heads at the middle diameter (MD) of the disks, the y-axis is the BPI capability of the heads at the outer diameter (OD) of the disks, and the z-axis is the calculated number of heads divided by the total number of heads. The joint BPI distribution provides an estimate of the probability that the heads meet the target performance metric at the MD and the OD.

The joint BPI distribution may predict, for example, that 10% of the heads in the measured disk drives can operate at a high frequency of 1.5× the reference frequency, 50% of the heads can operate at a high frequency of 1.25× the reference frequency, 90% of the heads can operate at the reference frequency, and 99.9% of the heads can operate at a low frequency of 0.75× the reference frequency.

For example, the linear bit density sensitivity of every head at zone K (where K ranges from 1 to M) at the six frequency samples is determined. If frequency 1K, frequency 2K . . . frequency 6K are the frequency samples at zone K, every head is positioned on the same track in zone K and the record/playback performance of each head is measured at every frequency sample using a target performance metric.

The BPI distributions can be calculated at the target performance metric as ID, 2D or 3D distributions that are marginal, individual or per zone distributions, respectively. The format optimizer uses the estimated frequency capability BPI distributions for every zone at the target performance metric to determine the storage capacity and yield.

Format Optimizer

The format optimizer 66 provides variable BPI optimization. The format optimizer 66 solves three constrained optimization problems in response to various inputs. The first problem maximizes the yield while preserving the storage capacity, the second problem maximizes the storage capacity while preserving the yield, and the third problem maximizes the yield while reducing the track density and meeting the storage capacity. The inputs include the number of different read/write frequencies (frequency profiles or formats), the number of heads in each disk drive, the BPI distributions, and the nominal storage capacity. The BPI distributions indicate the frequency capability distribution of the heads at a target performance metric.

The format optimizer 66 simultaneously searches through a continuous range of all possible frequency capabilities to maximize the yield such that the nominal storage capacity is met. The format optimizer 66 can also perform the same operation with the storage capacity and the yield interchanged.

The format optimizer 66 can optimize high and low data density as a function of the zones. For example, in a disk drive with eight heads, the possibilities are one head at high data density and seven heads at low data density, two heads at high data density and six heads at low data density, three heads at high data density and five heads at low data density, four heads at high data density and four heads at low data density, one head at low data density and seven heads at high data density, two heads at low data density and six heads at high data density, and three heads at low data density and five heads at high data density. The format optimizer 66 considers all the combinatorial possibilities, in each case solves a constrained optimization problem and chooses the optimal solution among the possibilities. Alternatively, the format optimizer 66 can reach the optimal solution more directly by non-linear mixed-integer programming.

Therefore, once the 1 D, 2D and 3D BPI distributions at a target performance metric are passed to the format optimizer 66, the format optimizer 66 solves two problems, (1) maximizing or improving the yield due to the target performance metric while meeting the desired nominal storage capacity, and (2) maximizing the storage capacity while meeting the desired nominal yield.

The format optimizer 66 mathematically casts these two problems as constrained optimization problems and solves them using well-known optimization techniques such as a line search algorithm. The constrained optimization problems can also be cast as non-linear mixed-integer programming and solved using existing optimization methods. Example constraints to be considered, and cast mathematically within the format optimizer 66, include not exceeding a certain frequency at the outer diameter due to ASIC data rate limitations or at the inner diameter due to head/disk limitations. Furthermore, closed form equations are derived and used in the format optimizer 66 to estimate the storage capacity and yield. The format generator 66 also considers possible overhead such as adding redundant bits due to error correction coding or gray coding.

The format optimizer 66 also uses information from the format generator 68 such as the calculated format efficiency per zone (defined in percentages as the amount of user data in blocks that can fit in all tracks in a zone), or the number of tracks per zone, to achieve a very close estimate of the storage capacity determined by the format generator 68. Then, the format optimizer 66 calculates optimal linear bit density format profiles as well as the optimal number of heads allocated to each vertically zoned format profile.

For example, histograms are extracted and the corresponding BPI distributions are estimated for different zones at the target on-track symbol error rate of $6\times10^{-7}$. A format design is provided for a disk drive with four heads and two frequencies to optimize yield while meeting storage capacity.

For example, the format optimizer 66 uses the 1 D, 2D and 3D BPI distributions at the target performance metric to jointly optimize for vertically zoned frequency format profiles and the corresponding number of head allocations three zones at a time. An advantage of considering three zones instead of one zone, and thus joint optimization instead of individual optimization, is that the joint optimization allows the frequency profiles to be optimized across the stroke on each disk surface. Therefore, joint optimization exploits the potential correlation in performance from one zone to another zone as well as their individual and weighted contribution to the storage capacity. Joint optimization is preferable for a high/low data density format across the stroke for either improving the yield while keeping the same storage capacity or improving the storage capacity while preserving the yield.

The format optimizer 66 generates the target high/low BPI formats per zone, the optimal number of head allocations per format, and an estimate of the storage capacity and yield. The accuracy of the estimates can be sensitive to the underlying BPI distributions at the target performance metric. Further, the target high/low BPI formats can be sensitive to the variance of the BPI distributions. And, the variance of the BPI distributions can be sensitive to the absolute value of the target performance metric and the type of target performance metric. In addition, the target high/low BPI formats are designed three zones at a time and the yield improvement while preserving the storage capacity is based on the profile of the target nominal formats. The format optimizer 66 also allows for smoothing the target variable BPI format designs. The format generator 68 determines the number of tracks per zone, the number of blocks per track, the radius at each zone, as well as block and track format efficiency. This information is saved in output files for use with the format optimizer 66. The format optimizer 66 then saves the target high/low BPI formats per zone that it generates in two separate files that can be loaded into the format generator 68.

Once the target format profiles are calculated, if they are non-smooth across the stroke, optionally a smoothing process is applied. The format profiles are then loaded into the format generator 68 to create vertically zoned formats and configuration pages. The formats and configuration pages are used by the disk drive firmware to create binary files to be loaded into the reserve image of the disk drives as part of the file system. In this fashion, the design and implementation of the format profiles as well as the number of optimal head allocations are performed off-line and are predetermined for every disk drive configuration.

For example, in a disk drive with four heads and four disk surfaces on two disks, the format optimizer 66 designs vertically zoned high and low frequency profiles. Every disk surface is uniformly partitioned into three zones across the stroke, at a track density with a fixed number of tracks per zone, vertically aligned from one disk surface to another. The nominal disk surface data storage before the vertical zoning can be approximated by the sum over all the zones of the nominal tracks per zone multiplied by the nominal BPI per track multiplied by the format efficiency per zone. Format efficiency per zone is the percentage of the user data that is effectively stored per zone. The nominal storage capacity is the nominal disk surface data storage multiplied by the total number of disk surfaces (or heads). The nominal number of tracks per zone and the format efficiency per zone can be generated by the format generator 68.

Performing vertical zoning to improve the yield without losing storage capacity finds the best frequency per zone and per head such that the disk drive meets performance and storage capacity requirements. If a disk drive with four heads fails due to the performance of head 1 at zone 1, but the performance of another head/zone pair, such as head 1 at zone 2 or head 3 at zone 1, is significantly better, passing the tests with reasonable margins, then a higher than nominal frequency at zone 1 or zone 2 is designed for the strong heads and the frequency at zone 1 for the weak head is lowered. This trade-off obtains a vertically zoned design of variable frequencies per zone such that the storage capacity is preserved. In addition, the number of heads per zone allocated to high or low data density is determined. Thus, the storage capacity can be approximated by the sum over all the zones of the number of strong heads multiplied by the high frequency data storage per zone multiplied by the format efficiency per zone plus the sum over all the zones of the number of weak heads multiplied by the low frequency data storage per zone multiplied by the format efficiency per zone.

For example, the format optimizer 66 is provided with joint BPI distributions at the target performance metric. Then, for every combinatorial possibility of head allocation to high or low frequency, the format optimizer 66 searches through a continuous range of possible frequencies by considering every zone independently using the marginal distributions and by the combination of zones using the joint BPI distributions to maximize the yield calculated using a closed form equation, such that the storage capacity after the vertical zoning is applied is essentially the same as the nominal storage capacity. Further, the optimal high and low frequency profiles for every combination of head allocations is compared and the one that results in the highest yield is chosen and passed to the format generator 68 for the generation of vertically zoned configuration pages to be used by the disk drive firmware.

The disk surfaces can be partitioned into more than three zones. To reduce computational complexity and time, if the selected/designed number of zones per disk surface is more than three, the format optimizer 66 can generate high and low frequency profiles three zones at a time and smooth the profile after post-processing. Another approach includes embedding the smoothing operator in the design and extending the joint optimization to all the zones to consider the impact of smoothing to yield calculation as part of the design rather than the later stages.

In the disk drive with four heads, the yield is maximized while preserving the nominal storage capacity. To determine the number of head allocations, the format optimizer 66 begins with one weak head and three strong heads per zone. The format optimizer 66 searches through a continuous range of possible frequency capabilities per zone, as well as two and three zones at a time, by considering the 1 D, 2D and 3D BPI distributions that result in the best calculated yield such that a minimum nominal storage capacity can be obtained. Next, the format optimizer 66 uses two weak heads and two strong heads and repeats solving the constrained optimization problem. This process is continued until all the combinatorial possibilities are considered. Finally, the format optimizer 66 chooses the solution that results in the best yield and provides the target high and low optimal data density format profiles and the associated number of high and low head allocations to the format generator 68. The format generator 68 then generates vertically zoned format files and configuration pages to be used by the disk drive firmware.

Format Generator

The format generator 68 generally performs three functions. First, the format generator 68 uses target formats/frequencies (or linear densities/BPI) for each zone and calculates the data storage of each zone and thus the storage capacity of the disk drive. Second, the format generator 68 calculates the format efficiency (the percent of the disk surface that is occupied by user data) for each zone. Third, the format generator 68 generates configuration pages. The configuration pages contain per-drive, per-zone, and per-head-per-zone parameters that are programmed into the disk drive electronics such as the preamplifier 21, the read/write channel 51 and the controller 57. The parameters are ordered such that the disk drive firmware selects the correct set of parameters to be programmed into each of the components for the particular head and zone that is being written to or read from at the time.

The format generator 68 calculates the frequency and the data storage of each zone taking into consideration limitations in the programmability and the capability of the disk drive components. For example, the heads 16 have varying down-track separation between the read and write elements, the preamplifier 21 has a minimum and maximum delay in turning on the write current, the read/write channel 51 synthesizer frequencies are limited to discrete frequencies, the motor driver 53 can keep the spindle motor 14 within a finite precision of the nominal rotational speed, the controller 57 has specific latencies in generating commands to the preamplifier 21 and the read/write channel 51 often with a finite uncertainty as to the exact timing of these commands, and a reference crystal (not shown) has finite accuracy and stability over temperature.

The format generator 68 can be fully automated, or can be directed by a human operator. In the absence of input from the format optimizer 66, the target per-zone BPI/frequency profiles, in particular, must be generated by a human operator. In general, the human operator modifies the target frequency profiles until the desired storage capacity is reached.

The format generator 68 includes a format efficiency process that uses the format optimizer 66 target high/low variable BPI format designs as well as the optimal predetermined number of high/low performing head allocations to modify and generate the appropriate configuration pages as part of the file system. For each zone, the format generator 68 selects the nearest frequency to the target frequency for that zone, given the component limitations mentioned above. The nearest frequency provides the target formats.

The optimal predetermined number of high/low performing head allocations comprises the number of heads allocated to each of the multiple frequencies in each zone. The format optimizer 66 determines the head allocation, which is input to the format generator 68. The capacity of a zone depends on the target frequencies and the number of heads allocated to each frequency.

The format optimizer 66 uses the nominal average BPI or frequency (nominal BPI format target designs) (e.g., one read/write frequency) in each zone from the format generator 68 to estimate the yield before applying the variable BPI designs. For a design with multiple frequencies per zone, this is the weighted average by the number of allocated heads of the multiple frequencies. The nominal format is created by a human operator working with the format generator 68 in an interactive manner.

The format generator 68 calculates the number of tracks per zone, number of blocks per track, radius at each zone as well as block and track format efficiency to calculate the zone data storage. The format optimizer 66 estimates the zone data storage using the tracks per zone, radii, and format efficiency. Thus, the format optimizer 66 and the format generator 68 interact as shown in FIG. 2A. For example, in a disk drive with four heads, and two data density format frequency profiles (high and low frequency profiles) with three zones across the disk surface, after the measurement and optimization processes, the format generator 68 is provided with two optimal frequency profiles and the optimal allocation of the heads. The format generator 68 then calculates the storage capacity, and if the disk drive meets the minimum required storage capacity, the format generator 68 generates the configuration pages for the disk drive firmware. The configuration pages are used by the disk drive firmware to command the head to write at an assigned frequency to a zone. If the calculated storage capacity does not meet the minimum required storage capacity, the format optimization is performed again with new format efficiency values and the process is repeated.

Head Assignments

Allocating the number of heads to the predetermined multiple frequencies in a zone, and assigning a particular head in a particular disk drive to a particular frequency, are distinct. The allocation is performed by the format optimizer 66 and applies to the disk drives of a particular design. The head assignments are then performed during manufacturing as part of a test process undergone by each disk drive to be produced.

Once the configuration pages are generated and converted to binary files as part of the file system, they can be loaded into a reserved image of the disk drive for use after power cycling. Then, for every disk drive, the assignments are performed per head and per zone to assign a predetermined number of heads to high BPI formats and the remaining heads to low BPI formats in a two frequency design, to satisfy the allocation of heads to the formats by the format optimizer 66.

The head assignments for the two frequency format where high and low frequencies are used includes the steps of:

(1) Load default parameters from the configuration pages, and calibrate selected parameters on a per head, per zone basis (e.g., load high BPI format profile for all the zones across the stroke);

(2) Take measurements from the heads at the disk surfaces at preselected zones with respect to a target performance metric;

(3) For each head in every measured zone, sort/rank the heads by the target performance metric from best to worst, select a prespecified (by the allocation process in the format optimizer 66) number of heads with the best performance, and assign those heads to the high frequency for a particular zone;

(4) Optionally interpolate between the measurements obtained from the preselected number of zones to find the results for the other zones, and do the same for the interpolated zones. The interpolation reduces the test time. Head performances are measured, sorted and assigned to a frequency for a subset of the total number of zones. For the remaining zones, the heads are assigned by interpolating the head assignments from the measurements;

(5) For every zone, save the worst prespecified number of weak heads with respect to the target performance metric; and (6) For every zone, load and calibrate the weak heads with the low BPI format.

The above process can improve storage capacity, improve yield and tradeoff between storage capacity and yield. In a test, the heads can pass or fail with respect to a target performance metric to determine if the test target limits are met.

The disk drive firmware is extended to load more than one format profile. A head can be assigned a different read/write frequency per zone across a disk surface, and radially similarly situated zones on different disk surfaces can have different read/write frequencies assigned to the corresponding heads whereby one head is assigned a different frequency/format profile than another head.

The head assignments apply to a format design with two recording frequencies per zone, but can be easily extended to more than two frequencies per zone and can be iterated to assign heads to more than two frequencies per zone. For example, in a design with H heads and F frequencies per zone, steps 1 and 2 are completed for the high frequency. The first selection of heads in step 3 assigns the highest h1 heads, where h1 is the prespecified number of heads allocated to the highest frequency for that zone. The remaining (H−h1) heads are then loaded and calibrated with the second highest frequency (step 1 again), measurements are taken (step 2 again), the heads are ordered relative to the metric and the best h2 heads are assigned to the second highest frequency (step 3 again). Here h2 is the prespecified number of heads allocated to the second highest frequency in the zone. Steps 1–3 are then iterated for the (H−h1−h2) heads, followed by the (H−h1−h2−h3) heads, and so on, until hF heads remain to be assigned to the lowest frequency. The set of {h1 . . . hF} heads receive the head allocation made by the format optimizer 66.

Table 1 illustrates the vertical zoning head assignments on a disk drive with six heads and five zones across the stroke on each disk surface. Each head is assigned to either a high or low data density format based on record/playback performance of that head, and the number of heads assigned to high data density and the number of heads assigned to low data density is according to the head allocation determined by the format optimizer 66.

TABLE 1

Example format assignment of a disk drive after test using vertical zoning with variable BPI across zones.

| HEAD | ZONE 1 | ZONE 2 | ZONE 3 | ZONE 4 | ZONE 5 |
|---|---|---|---|---|---|
| 0 | Low | High | Low | High | Low |
| 1 | High | Low | High | High | Low |
| 2 | High | Low | High | Low | High |
| 3 | High | High | Low | High | High |
| 4 | Low | High | High | High | High |
| 5 | High | High | High | Low | High |

Figure 3:
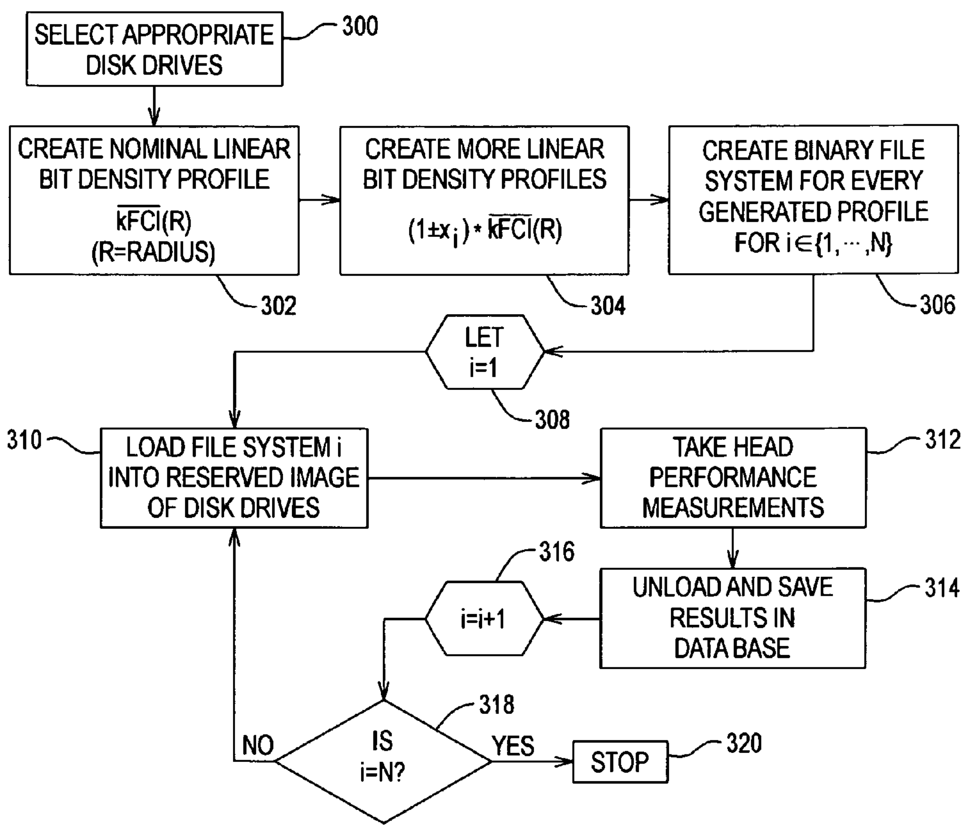
FIG. 3 shows a flowchart of vertical zoning data collection in FIG. 2A.

FIG. 3 shows a flowchart of vertical zoning data collection that includes the steps of:

(1) Select a number of disk drives for data measurement/collection (step 300);

(2) Create a nominal linear bit density profile KFCI (nominal KFCI): $\overline{\text{kFCI}}(R)$, where R is the disk radius (step 302);

(3) Create more linear bit density profiles by multiplying the nominal KFCI by the scaling factor $x_i$ (step 304):

$$(1\pm x_i)^*\overline{\text{kFCI}}(R)$$

(4) Create a binary file system for every generated profile (step 306):

$$i\in\{1, \ldots, N\}$$

where N is the total number of frequency format profiles, for example, for N=2, having $X_1$, and $X_2$, if $X_1$=0.05 and $X_2$=0.1, then including the nominal frequency format there are five different frequency profiles in step 304 as follows: (a) nominal KFCI, (b) 1.05×nominal KFCI, (c) 0.95×nominal KFCI, (d) 1.1×nominal KFCI, and (e) 0.90×nominal KFCI;

(5) Select the first head by setting i to 1 (step 308);

(6) Load the file system i into the reserved image of the disk drives (step 310);

(7) Take the head performance measurements (step 312);

(8) Unload and save the results in the data base (step 314);

(9) Increment i by one (step 316);

(10) Determine if i=N (step 318);

(11) If not, go to step 310; and

(12) Otherwise, stop (step 320).

The above process collects performance data for all the heads at all the zones.

Figure 4:
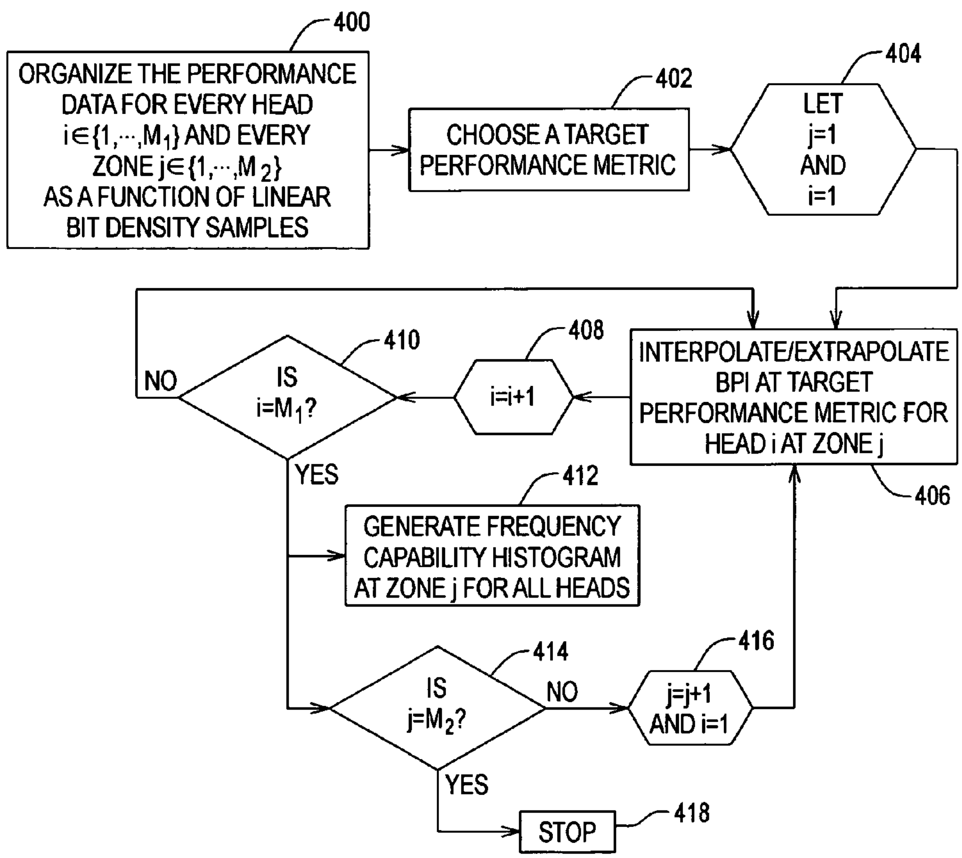
FIG. 4 shows a flowchart of vertical zoning and per zone joint BPI distribution extraction in FIG. 2A.

FIG. 4 shows a flowchart of vertical zoning post-measurement and per zone BPI distribution extraction that includes the steps of:

(1) Organize the head performance data for every head $i\in\{1, \ldots, M_1\}$ and every zone $j\in\{1, \ldots, M_2\}$ as a function of the linear bit density samples, where $M_1$ is the total number of heads in the disk drives selected for measurement and $M_2$ is the total number of zones, to generate head performance histograms (step 400);

(2) Choose a target performance metric (step 402);

(3) Set j=1 and i=1 (step 404); (4) Interpolate/extrapolate BPI at the target performance metric for head i at zone j (step 406);

(5) Select the next head by incrementing i by one (step 408);

(6) Determine if all the heads have been processed by determining if i=$M_1$ (step 410);

(7) If not, go to step 406 to process the next head, otherwise generate a frequency capability histogram at zone j for all the heads (step 412);

(8) Determine if all the zones have been processed by determining if j=$M_2$ (step 414);

(9) If not, move to the next zone and start with the first head again, set j=j+1 and i=1 (step 416) and go to step 406; and

(10) Otherwise, stop (step 418).

The above process generates 1 D frequency capability histograms at a target performance metric for every zone by considering all the heads from the sample disk drives selected for measurement. Using the 1 D frequency capability histograms at a target performance metric, probability theory known to those skilled in the art can be adopted to estimate the 1 D frequency capability distributions. Further, the above process is extended by using 2D and 3D interpolation/extrapolation routines to extract and estimate the 2D and 3D joint frequency capability histograms and their associated distributions.

Figure 5:
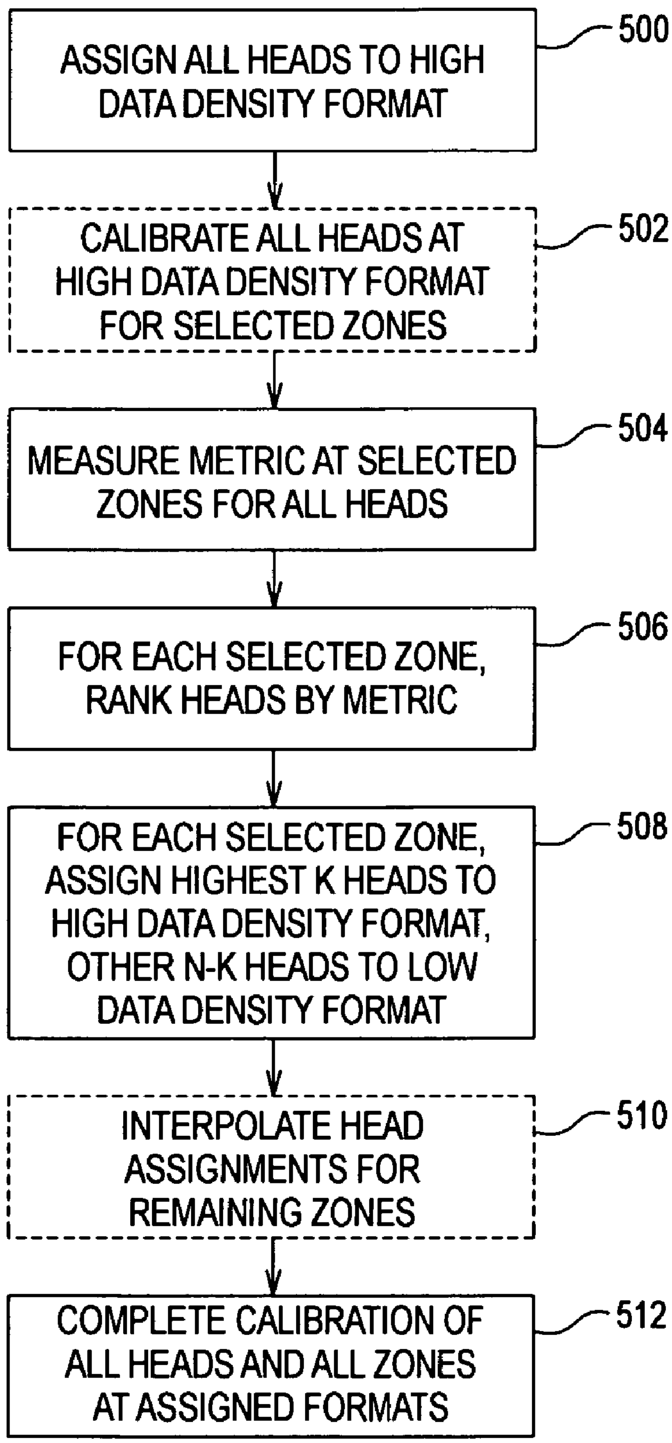
FIG. 5 shows a flowchart of head assignments in FIG. 2A.

FIG. 5 shows a flowchart of head assignments for N heads with a two frequency format (high/low data density) that includes the steps of:

(1) Assign all the heads in a disk drive to the high data density format (step 500);

(2) Calibrate all the heads at the high data density format for selected zones (step 502);

(3) Measure the head performance metric at the selected zones for all the heads (step 504);

(4) For each selected zone, rank the heads by the head performance metric (step 506);

(5) For each selected zone, assign the highest K heads to the high data density format, and assign the other N−K heads to the low data density format (step 508);

(6) Optionally interpolate the head assignments for the remaining zones (step 510); and (7) Complete the calibration of all the heads and all the zones at the assigned formats (step 512).

The above process completes the assignment of each head in each disk drive to a predetermined frequency.

The format generator 68 passes the track formats to the format optimizer 66 to have a more accurate way of calculating the storage capacity (nominal format). Such information and constraints are provided to the format optimizer 66 to solve the joint optimization problems. The format optimizer 66 performs a coarse calculation of the storage capacity, whereas the format generator 68 performs an exact calculation of the storage capacity. The format generator 68 provides format information (such as number of tracks per zone, and the zone format) to the format optimizer 66, and calculates the exact storage capacity. Such information is passed once from the format generator 68 to the format optimizer 66 for a head design with a given number of heads. The format generator 68 initially provides nominal information to the format optimizer 66, and the format optimizer 66 performs its calculation of target densities (zone frequencies and number of heads allocated to each frequency) and provides that information to the format generator 68. The format generator 68 then determines if required storage capacity has been reached. Adjusting the target densities to meet storage capacity and/or yield requirements includes adjusting the selected zone density or zone frequencies.

Figure 6:
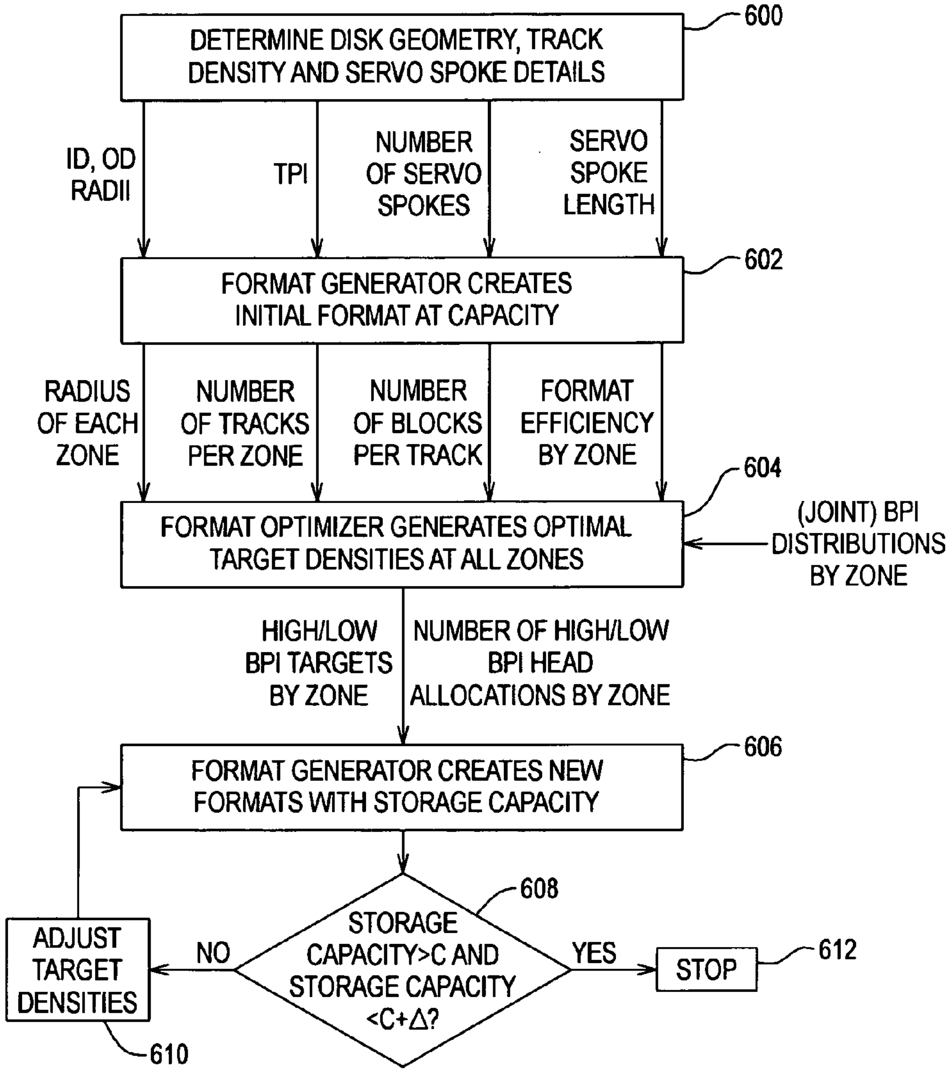
FIG. 6 shows a flowchart of format generation and optimization in FIG. 2A.

FIG. 6 shows a flowchart of format generation and optimization in which an iterative process for a minimum storage capacity (C) and a user specified storage overcapacity (Δ) includes the steps of:

(1) Determine the disk geometry, track density and servo spoke details, and provide the inner diameter (ID) and outer diameter (OD) radii, the track density (TPI), the number of servo spokes, and the servo spoke length (step 600);

(2) The format generator 68 generates the initial format at the storage capacity using the ID and OD radii, the TPI, the number of servo spokes and the servo spoke length, and provides the radius of each zone per disk surface, the number of tracks per zone, the number of blocks per track, and the format efficiency by zone (step 602);

(3) The format optimizer 66 generates optimal target densities at all the zones using the radius of each zone per disk surface, the number of tracks per zone, the number of blocks per track, and the format efficiency by zone and provides the high and low BPI targets by zone and the number of high and low BPI head allocations by zone (step 604);

(4) The format generator 68 generates new formats with a storage capacity (the number of logical blocks per disk drive) (step 606);

(5) Determine if the storage capacity>C and the storage capacity<(C+Δ) (step 608);

(6) If not, adjust the target densities (step 610) and go to step 606; and (7) Otherwise, stop (step 612).

For example, the disk surface capacity is TPI×BPI×(1+ECC)/FE, where TPI is the track density, BPI is the linear bit density, ECC is the fractional level of error correcting code which is typically about 0.1, and FE is the format efficiency which is typically about 0.57.

The above process completes the format generation. As another example, a set of thirty-two mature disk drives are selected and each disk drive includes twelve heads. The 1 D, 2D and 3D BPI distributions are extracted at an on-track symbol error rate from the outer, middle and inner zones. Next, the BPI distributions are fed to the format optimizer 66, and high or low frequency per zone format designs are obtained at the three zones. This is performed once by individual optimization based on 1 D BPI distributions at each of the three zones, and once by joint optimization based on the measurements obtained from the three zones and their extracted 1D, 2D and 3D BPI distributions. The head format allocation search is performed by simulation, and for each zone the one-format designs before the application of vertical zoning are a special case of the two-format variable BPI designs by forcing the high and low formats to be equal to the nominal BPI format at that zone. Furthermore, the pass/fail of the disk drives is based on each head at every zone passing a target on-track symbol error rate as well as off-track squeeze and unsqueeze offset margins. Then, the yield is calculated by simulation by interpolation/extrapolation of the measurement data before and after the application of vertical zoning (VZ). Table 2 summarizes the results:

TABLE 2

| | Using Joint Optimization | Using Individual Optimization |
|---|---|---|
| Drive Yield (Yd) | 93.75 | 90.625 |
| Drives failed after VZ | 4 & 29 | 4, 6 & 29 |
| Drives recovered | 2, 3, 13, 19, 21 & 25 | 2, 3, 13, 19, 21 & 25 |
| Passed drives failed after VZ | None | 6 |
| Drives failed before VZ | 2, 3, 4, 12, 19, 21 & 29 i.e., drive yield before VZ Yd = 75% | 2, 3, 4, 12, 19, 21 & 29 i.e., drive yield after VZ Yd = 75% |

Although a manufacturing test case for a two format design is illustrated, the search algorithm can be easily generalized to a higher number of formats. The design of two formats based on 1 D, 2D and 3D BPI distributions can easily be generalized to higher order or dimensions by considering more than three zones. The format design can be generalized from two to a higher number of formats. The measurement procedure can be generalized to consider more zones as well as off-track measurements such as 747 curves or quality metrics versus error rate measurements to perform a correlation study for the best metric with the least test time.

Further, the per zone variable BPI design can be easily extended to a variable BPI/TPI design. The measurement process is extended to include 747 measurements of all the heads from a preselected number of disk drives. To speed up the measurements, instead of 747 measurements, off-track and adjacency margin squeeze measurements of the heads can be performed. Once the 747 data of the heads at a preselected number of zones is determined, for every zone, joint BPI/TPI distributions can be extracted at the target(s) by post-measurement data processing. The choice of a target is an integral part of the performance gain, such as yield, due to the per zone variable BPI/TPI designs. Some example targets are off-track symbol error rate, position error signal variance, and a combination of both. After the joint BPI/TPI distributions are extracted and available for the zones, a per zone variable BPI/TPI design can be obtained by solving two constrained (joint) optimization problems: one that maximizes the yield while keeping the same disk drive areal density, and another that maximizes the disk drive areal density while keeping the same yield. Once the per zone variable BPI/TPI designs are obtained, a preselected number of heads are allocated to high and low density BPI and TPI formats, for example, for a two variable BPI/TPI per zone design performed as part of the test process.

The present invention improves storage capacity (and consequently areal density at a fixed target BPI) and yield and reduces the target TPI by increasing the average BPI across the stroke per head (depending on the number of formats considered) to meet a desire storage capacity. In particular, the BPI at the outer diameter may be limited by the maximum deliverable data rate of the ASIC components. For example, if the controller 57 has a maximum deliverable data rate of 650 MHz, the preamplifier 21 has a maximum deliverable data rate of 700 MHz and the read/write channel 51 has a maximum deliverable data rate of 750 MHz, then the BPI at the outer diameter is limited by the controller 57 at a maximum deliverable data rate of 650 MHz. Thus, a conventional one format BPI profile across the stroke does not achieve the desired storage capacity and yield, whereas the present invention per zone variable BPI target formats meet the desired storage capacity at a fixed target TPI while improving the yield.

The data measurer 62 can be implemented by a general purpose computer 61 and the drive electronics of the disk drive 100. The general purpose computer 61 can be a high end PC, a PC server or a workstation and include programmable simulation software. The drive electronics can include the logic circuit 49 and the controller 57. The logic circuit 49 performs the measurements and the controller 57 directs the logic circuit 49 and transfers the data to the general purpose computer 61. The head assignments can be implemented by the controller 57 with the data collection sub-task performed by the logic circuit 49. The post-measurement data processor 64, the format optimizer 66 and the format generator 68 can be implemented by the general purpose computer 61.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of defining a storage format in multiple data storage devices, each data storage device having a plurality of storage media and a plurality of corresponding data transducer heads, each head for recording on and playback of information from a corresponding storage media in multiple zones, the method comprising the steps of:

(a) (1) for a sample number of said data storage devices, measuring a performance of each head in the sample number of said data storage devices at one or more read/write frequencies per zone, and (2) for said multiple data storage devices, based on said performance measurements, jointly selecting a group of read/write frequencies, two or more read/write frequencies for each zone, and allocating one or more of the heads in each of the multiple data storage devices to each frequency in said group of frequencies per zone; and (b) in each of said multiple data storage devices, assigning one of said frequencies to each head per zone, based on a capability of that head.

2. The method of claim 1, wherein in step (a)(1) measuring a performance of each head further includes the step of measuring a record/playback performance of that head at one or more read/write frequencies.

3. The method of claim 1, wherein in step (a)(1) measuring a performance of each head further includes the step of measuring a record/playback performance of that head at multiple storage media locations.

4. The method of claim 1, wherein in step (a)(1) measuring a performance of each head further includes the step of measuring a record/playback performance of that head according to a performance metric at different frequencies.

5. The method of claim 4, wherein said performance metric includes at least one of on-track symbol error rate, off-track symbol error rate, on-track mean square error, and off-track mean square error.

6. The method of claim 1, wherein step (a) is performed in a storage format design process and step (b) is performed in a test process.

7. The method of claim 6, wherein the storage format design process is part of a data storage device design phase and the test process is part of a data storage device manufacturing phase.

8. The method of claim 1, wherein step (a)(1) further includes the steps of calibrating each of said multiple data storage devices for each of said frequencies.

9. The method of claim 1, wherein step (a)(2) further includes the step of jointly selecting said frequencies and allocating said heads to said frequencies, to satisfy a specified constraint.

10. The method of claim 9, wherein:

step (a)(1) further includes the steps of, for each of said sample number of said data storage devices:

selecting a performance metric for the heads in that data storage device for each zone; and measuring a performance of each head at different frequencies per zone based on said metric; and step (a)(2) further includes the step of, for the multiple data storage devices:

based on said performance measurements, for each zone allocating an integral number of said heads to each of said frequencies for that zone to satisfy the specified constraint.

11. The method of claim 10, wherein in step (a)(2) allocating said heads to said frequencies per zone further includes the step of, for each zone, based on the performance of the heads in a plurality of zones, allocating an integral number of said heads to each of said frequencies for that zone to satisfy said constraint for said multiple data storage devices.

12. The method of claim 10, wherein step (a)(2) further includes the steps of:

based on said performance measurements, generating record/playback frequency capability distributions of the heads in the sample number of said data storage devices, at each zone for a target performance metric, and based on said distributions, allocating an integral number of said heads to each of said frequencies for that zone to satisfy said constraint for said multiple data storage devices.

13. The method of claim 9, wherein said constraint comprises providing a required data storage capacity for each of said multiple data storage devices.

14. The method of claim 9, wherein said constraint comprises providing a required data storage device yield for said multiple data storage devices.

15. The method of claim 9, wherein said constraint comprises maximizing a data storage device yield for the multiple data storage devices while providing a specified data storage device capacity for the multiple data storage devices.

16. The method of claim 9, wherein said constraint comprises maximizing a data storage capacity for each of the multiple data storage devices while providing a specified data storage device yield for the multiple data storage devices.

17. A method of defining a storage format in multiple data storage devices, each data storage device having a plurality of storage media and a plurality of corresponding data transducer heads, each head for recording on and playback of information from a corresponding storage media in multiple zones, the method comprising the steps of:

(a) (1) for a sample number of said data storage devices, measuring a performance of each head in the sample number of said data storage devices at one or more read/write frequencies per zone, and based on said performance measurements, generating performance distributions of the heads in said sample number of said data storage devices, at each zone for a target performance metric, and (2) for said multiple data storage devices, based on said performance distributions, jointly selecting a group of read/write frequencies, two or more read/write frequencies for each zone, and allocating one or more of the heads in each of the multiple data storage devices to each frequency in said group of frequencies per zone; and (b) in each of said multiple data storage devices, assigning one of said frequencies to each head per zone, based on a capability of that head.

18. The method of claim 17, wherein generating said distributions further includes the steps of:

estimating a record/playback frequency capability of each head based on said performance measurements; and generating record/playback frequency capability distributions of the heads at each zone for said target performance metric based on said estimated record/playback frequency capabilities of the heads.

19. The method of claim 17, wherein the of generating said distributions is performed in a post-processing phase.

20. The method of claim 17, wherein generating said distributions includes the step of generating record/playback frequency capability distributions of the heads based on said performance measurements at said target performance metric for the heads in said sample number of said data storage devices.

21. The method of claim 17, wherein in step (a)(2) selecting said group of frequencies further includes the step of selecting said group of frequencies to satisfy a specified constraint.

22. The method of claim 17, wherein said performance metric includes at least one of on-track symbol error rate, off-track symbol error rate, on-track mean square error, and off-track mean square error.

23. A method of defining a storage format in multiple data storage devices, each data storage device having a plurality of storage media and a plurality of corresponding data transducer heads, each head for recording on and playback of information from a corresponding storage media in multiple zones, the method comprising the steps of:

(a) (1) for a sample number of said data storage devices, measuring a performance of each head in the sample number of said data storage devices at one or more read/write frequencies per zone, and (2) for said multiple data storage devices, based on said performance measurements, jointly selecting a group of read/write frequencies, two or more read/write frequencies for each zone, and for each zone allocating an integral number of said heads to each of said frequencies for that zone to satisfy a constraint; and (b) in each of said multiple data storage devices, assigning one of said frequencies to each head per zone, based on a capability of that head and said allocation of the heads.

24. The method of claim 23, wherein step (b) further includes the steps of, for each of said multiple data storage devices:

(i) obtaining a record/playback performance of each head at a performance metric per zone at one of said read/write frequencies;

(ii) for each zone, ranking the heads from best to worst according to the performance metric; and (iii) assigning said allocated number of heads, according to the ranking, to one of said read/write frequencies.

25. The method of claim 24, further comprising the step of:

repeating steps (i)–(iii) for the remaining heads at the other read/write frequencies.

26. The method of claim 24, wherein steps (i)–(iii) are repeated for each of said frequencies, starting from the highest frequency to the lowest frequency.

27. The method of claim 24, wherein step (ii) further includes the step of selecting said performance metric for the heads in that data storage device for each zone.

28. The method of claim 23, wherein for each head in said multiple data storage devices, the same number of said zones are on different storage media in each data storage device.

29. The method of claim 23, wherein for each head in said multiple data storage devices, the same number of said zones are on the same storage media in each data storage device.

30. The method of claim 23, wherein in step (a)(2) said constraint comprises providing a specified data storage capacity for each of the multiple data storage devices while maximizing a data storage device yield for the multiple data storage devices.

31. The method of claim 23, wherein in step (a)(2) said constraint comprises maximizing a Data storage capacity for each of the multiple data storage devices while providing a specified data storage device yield for the multiple data storage devices.

32. The method of claim 23, wherein step (b) further includes the step of calibrating each data storage device for each frequency.

33. A method of defining a storage format in multiple data storage devices, each data storage device having a plurality of storage media and a plurality of corresponding data transducer heads, each head for recording on and playback of information from a corresponding storage media in multiple zones, the method comprising the steps of:

(a) (1) for a sample number of said data storage devices, measuring a performance of each head in the sample number of said data storage devices at one or more read/write frequencies per zone, and (2) for said multiple data storage devices, based on said performance measurements, jointly selecting a group of read/write frequencies, two or more read/write frequencies for each zone, and allocating one or more of the heads in each of the multiple data storage devices to each frequency in said group of frequencies per zone; and (b) in each of said multiple data storage devices, assigning one of said frequencies to each head per zone, based on a capability of that head;

wherein in each of said multiple data storage devices:

said multiple zones on each storage media are arranged as concentric zones, each zone having an inner and an outer boundary at different radial locations on the storage media, such that each storage media includes the same number of concentric zones as other storage media in that data storage device, and the boundaries of radially similarly situated zones on all the storage media in that data storage device are at the same radial locations.

34. The method of claim 33, wherein radially similarly situated zones on all the storage media include the same number of concentric tracks.

35. The method of claim 33, wherein at least a number of radially similarly situated zones on all the storage media include a different number of concentric tracks.

36. A method of defining a storage format in multiple data storage devices, each data storage device having a plurality of storage media and a plurality of corresponding data transducer heads, each head for recording on and playback of information from a corresponding storage media in multiple zones, the method comprising the steps of:

(a) (1) for a sample number of said data storage devices, measuring a performance of each head in the sample number of said data storage devices at one or more read/write frequencies per zone, and (2) for said multiple data storage devices, based on said performance measurements, jointly selecting a group of read/write frequencies, two or more read/write frequencies for each zone, and allocating one or more of the heads in each of the multiple data storage devices to each frequency in said group of frequencies per zone; and (b) in each of said multiple data storage devices, assigning one of said frequencies to each head per zone, based on a capability of that head;

wherein in each of said multiple data storage devices:

said multiple zones on each storage media are arranged as concentric zones, each zone having an inner and an outer boundary at different radial locations on the storage media, such that each storage media includes a sequence of concentric zones, and the boundaries of at least a number of sequentially similarly situated zones on different storage media in that data storage device are at different radial locations.

37. The method of claim 36, wherein sequentially similarly situated zones on all the storage media include the same number of concentric tracks.

38. The method of claim 36, wherein at least a number of sequentially similarly situated zones on all the storage media include a different number of concentric tracks.

39. A data storage device comprising a plurality of pairs of storage media surfaces and transducer heads, each head for recording on and playback of information from a corresponding storage media surface in multiple zones, and a controller that controls the heads for reading and writing data on the storage media surfaces, the controller being programmed to write data in a storage format defined by the steps including:

(a) (1) for a sample number of multiple data storage devices, measuring a performance of each head in the sample number of said data storage devices at one or more read/write frequencies per zone, and (2) for said data storage device, based on said performance measurements, jointly selecting a group of read/write frequencies, two or more read/write frequencies for each zone, and allocating one or more of the heads in said data storage device to each frequency in said group of frequencies per zone; and (b) in said data storage device, assigning one of said frequencies to each head per zone, based on a capability of that head, thereby defining said storage format.

40. The data storage device of claim 39, wherein in step (a)(1) measuring a performance of each head further includes the step of measuring a record/playback performance of that head according to a performance metric at different frequencies.

41. The data storage device of claim 39, wherein step (a) is performed in a data storage device design phase and step (b) is performed in a data storage device manufacturing phase.

42. The data storage device of claim 39, wherein step (a)(1) further includes the step of calibrating each of said multiple data storage devices for each of said frequencies.

43. The data storage device of claim 39, wherein step (a)(2) further includes the step jointly selecting said frequencies and allocating said heads to said frequencies, to satisfy a specified constraint.

44. The data storage device of claim 43, wherein:

step (a)(1) further includes the steps of, for each of said sample number of said data storage devices:

selecting a performance metric for the heads in that data storage device for each zone; and measuring a performance of each head at different frequencies per zone based on said metric; and step (a)(2) further includes the step of, for the multiple data storage devices:

based on said performance measurements, for each zone allocating an integral number of said heads to each of said frequencies for that zone to satisfy the constraint.

45. The data storage device of claim 44, wherein in step (a)(2) allocating said heads to said frequencies per zone further includes the step of, for each zone, based on the performance of the heads in a plurality of zones, allocating an integral number of said heads to each of said frequencies for that zone to satisfy said constraint for said multiple data storage devices.

46. The data storage device of claim 44, wherein step (a)(2) further includes the steps of:

based on said performance measurements, generating record/playback frequency capability distributions of the heads in the sample number of said data storage devices, at each zone for a target performance metric; and based on said distributions, allocating an integral number of said heads to each of said frequencies for that zone to satisfy said constraint for said multiple data storage devices.

47. The data storage device of claim 43, wherein said constraint comprises providing a required data storage capacity for each of said multiple data storage devices.

48. The data storage device of claim 43, wherein said constraint comprises providing a required data storage device yield for said multiple data storage devices.

49. The data storage device of claim 43, wherein said constraint comprises maximizing a data storage device yield for the multiple data storage devices while providing a specified data storage device capacity for the multiple data storage devices.

50. The data storage device of claim 43, wherein said constraint comprises maximizing a data storage capacity for each of the multiple data storage devices while providing a specified data storage device yield for the multiple data storage devices.

51. A data storage device comprising a plurality of pairs of storage media surfaces and transducer heads, each head for recording on and playback of information from a corresponding storage media surface multiple zones, and a controller that controls the heads for reading and writing data on the storage media surfaces, the controller being programmed to write data in a storage format defined by the steps including:

(a) (1) for a sample number of multiple data storage devices, measuring a performance of each head in the sample number of said data storage devices at one or more read/write frequencies per zone, and based on said performance measurements, generating performance distributions of the heads in said sample number of said data storage devices, at each zone for a target performance metric, and (2) for the data storage device, based on said performance distributions, jointly selecting a group of read/write frequencies, two or more read/write frequencies for each zone, and allocating one or more of the heads in each of the multiple data storage devices to each frequency in said group of frequencies per zone; and (b) in the data storage device, assigning one of said frequencies to each head per zone, based on a capability of that head.

52. The data storage device of claim 51, wherein generating said distributions further includes the steps of:

estimating a record/playback frequency capability of each head based on said performance measurements; and generating record/playback frequency capability distributions of the heads at each zone for said a target performance metric based on said estimated record/playback frequency capabilities of the heads.

53. The data storage device of claim 51 wherein the step of generating said distributions is performed in a post-processing phase.

54. The data storage device of claim 51, wherein generating said distributions includes the step of generating record/playback frequency capability distributions of the heads based on said performance measurements at said target performance metric for the heads in said sample number of said data storage devices.

55. The data storage device of claim 51, wherein in step (a)(2) selecting said group of frequencies further includes the step of selecting said group of frequencies to satisfy a specified constraint.

56. A data storage device comprising a plurality of pairs of storage media surfaces and transducer heads, each head for recording on and playback of information from a corresponding storage media surface in multiple zones, and a controller that controls the heads for reading and writing data on the storage media surfaces, the controller being programmed to write data in a storage format defined by the steps including:

(a) (1) for a sample number of multiple data storage devices, measuring a performance of each head in the sample number of said data storage devices at one or more read/write frequencies per zone, and (2) for said data storage device, based on said performance measurements, jointly selecting a group of read/write frequencies, two or more read/write frequencies for each zone, and for each zone allocating an integral number of said heads to each of said frequencies for that zone to satisfy a constraint; and (b) in said data storage device, assigning one of said frequencies to each head per zone, based on a capability of that head and said allocation of the heads.

57. The data storage device of claim 56, wherein step (b) further includes the steps of, for the data storage device:

(i) obtaining a record/playback performance of each head at a performance metric per zone at one of said read/write frequencies;

(ii) for each zone, ranking the heads from best to worst according to the performance metric; and (iii) assigning said allocated number of heads, according to the ranking, to one of said read/write frequencies.

58. The data storage device of claim 57, wherein step (b) further comprises the step of:

repeating steps (i)–(iii) for the remaining heads at the other read/write frequencies.

59. The data storage device of claim 57, wherein step (b) further includes the step of selecting said performance metric for the heads in the data storage device for each zone.

60. The data storage device of claim 56, wherein in step (a)(2) said constraint comprises providing a specified data storage capacity for the multiple data storage devices while maximizing a data storage device yield for the multiple data storage devices.

61. The data storage device of claim 56, wherein in step (a)(2) said constraint comprises maximizing a data storage capacity for each of the multiple data storage devices while providing a specified data storage device yield for the multiple data storage devices.

62. A data storage device comprising a plurality of pairs of storage media surfaces and transducer heads, each a head for recording on and playback of information from a corresponding storage media surface medium in multiple zones, and a controller that controls the heads for reading and writing data on the storage media surfaces, the controller being programmed to write data in said multiple zones, wherein:

said multiple zones on each storage media are arranged as concentric zones, each zone having an inner and an outer boundary at different radial locations on the storage media, such that each storage media includes a sequence of concentric zones, and the boundaries of at least a number of sequentially similarly situated zones on different storage media in the data storage device are at different radial locations, wherein sequentially similarly situated zones on all the storage media include the same number of concentric tracks.

* * * * *